US010706265B2

(12) United States Patent
Kerger

(10) Patent No.: US 10,706,265 B2
(45) Date of Patent: Jul. 7, 2020

(54) SCANNING A REAL-TIME MEDIA STREAM TO DETECT ONE OR MORE FACES THAT ARE PREVALENT AMONG A SET OF MEDIA FILES STORED ON A USER EQUIPMENT

(71) Applicant: QUALCOMM Incorporated, San Diego, CA (US)

(72) Inventor: Kameron Kerger, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 15/663,686

(22) Filed: Jul. 28, 2017

(65) Prior Publication Data
US 2019/0034701 A1 Jan. 31, 2019

(51) Int. Cl.
*G06K 9/00* (2006.01)
*H04N 7/14* (2006.01)
(Continued)

(52) U.S. Cl.
CPC ....... *G06K 9/00288* (2013.01); *G06F 16/951* (2019.01); *G06K 9/00255* (2013.01);
(Continued)

(58) Field of Classification Search
CPC .............. G06F 16/951; G06K 9/00255; G06K 9/00268; G06K 9/00288; G06K 9/00677;
(Continued)

(56) References Cited

U.S. PATENT DOCUMENTS 8,611,678 B2 * 12/2013 Hanson ................ G06F 16/51
382/225
8,856,541 B1 * 10/2014 Chaudhury ............. G06F 21/32
382/115
(Continued)

FOREIGN PATENT DOCUMENTS

EP 1737216 A1 12/2006
EP 2104058 A1 9/2009
WO 2015022689 A1 2/2015

OTHER PUBLICATIONS

Partial International Search Report—PCT/US2018/034556—ISA/EPO—dated Sep. 13, 2018.
(Continued)

*Primary Examiner* — Ian L Lemieux
(74) *Attorney, Agent, or Firm* — Muncy, Geissler, Olds & Lowe, P.C.

(57) ABSTRACT

In an embodiment, a user equipment (UE) recognizes a set of faces within a set of media files stored on the UE using facial recognition. The UE identifies a set of prevalent faces based on a set of criteria including a prevalence of one or more faces among the set of media files. The UE scans real-time media using facial recognition to determine whether any prevalent faces from the set of prevalent faces are present in the real-time media. The UE performs an action based on whether the scanning detects any prevalent faces from the set of prevalent faces in the real-time media. By way of example, the action may include adding one or more enhancement effects to the real-time media, authoriz-
(Continued)

ing a communicative operation to proceed, authorizing access to the UE, or any combination thereof.

26 Claims, 22 Drawing Sheets

(51) Int. Cl.
| | |
|---|---|
| *H04N 7/15* | (2006.01) |
| *H04N 5/232* | (2006.01) |
| *G06F 16/951* | (2019.01) |
| *G06T 11/60* | (2006.01) |
| *H04L 12/58* | (2006.01) |
| *H04L 29/06* | (2006.01) |

(52) U.S. Cl.
CPC ..... *G06K 9/00268* (2013.01); *G06K 9/00677* (2013.01); *G06K 9/00744* (2013.01); *G06T 11/60* (2013.01); *H04L 51/32* (2013.01); *H04L 63/0861* (2013.01); *H04L 65/60* (2013.01); *H04N 5/232* (2013.01); *H04N 7/147* (2013.01); *H04N 7/15* (2013.01); *H04N 2007/145* (2013.01)

(58) Field of Classification Search
CPC ..... G06K 9/00744; G06T 11/60; H04L 51/32; H04L 63/0861; H04L 65/60; H04N 2007/145; H04N 5/232; H04N 7/147; H04N 7/15
See application file for complete search history.

(56) References Cited

U.S. PATENT DOCUMENTS

| | | | | |
|---|---|---|---|---|
| 8,923,551 | B1* | 12/2014 | Grosz | H04N 1/00161 382/100 |
| 9,087,273 | B2* | 7/2015 | Garcia | G06K 9/00288 |
| 9,147,117 | B1* | 9/2015 | Madhu | G06K 9/00335 |
| 10,242,034 | B1* | 3/2019 | Li | G06K 9/00288 |
| 2007/0171296 | A1* | 7/2007 | Tsukiji | G06K 9/00255 348/345 |
| 2007/0239683 | A1* | 10/2007 | Gallagher | G06K 9/00221 |
| 2009/0232364 | A1* | 9/2009 | Hosoi | G06K 9/00261 382/118 |
| 2011/0047384 | A1* | 2/2011 | Jacobs | G06K 9/00221 713/176 |
| 2011/0211736 | A1 | 9/2011 | Krupka et al. | |
| 2012/0314917 | A1* | 12/2012 | Kiyohara | H04L 63/10 382/118 |
| 2013/0015946 | A1* | 1/2013 | Lau | G07C 9/00 340/5.2 |
| 2013/0102297 | A1* | 4/2013 | Chavernac | G06F 21/31 455/415 |
| 2013/0247175 | A1* | 9/2013 | Nechyba | G06F 21/32 726/19 |
| 2014/0181123 | A1 | 6/2014 | Tuffet et al. | |
| 2014/0250132 | A1 | 9/2014 | Pollak | |
| 2014/0270407 | A1* | 9/2014 | Balakrishnan | G06F 16/5838 382/118 |
| 2015/0016693 | A1 | 1/2015 | Gattuso et al. | |
| 2016/0224837 | A1 | 8/2016 | Lipert et al. | |
| 2016/0224841 | A1* | 8/2016 | Rosenkrantz | G06F 16/51 |
| 2017/0353423 | A1* | 12/2017 | Morrison | H04L 51/32 |
| 2018/0285357 | A1* | 10/2018 | Chang | G06K 9/00288 |

OTHER PUBLICATIONS

International Search Report and Written Opinion—PCT/US2018/034556—ISA/EPO—Nov. 13, 2018.

* cited by examiner

SCANNING A REAL-TIME MEDIA STREAM TO DETECT ONE OR MORE FACES THAT ARE PREVALENT AMONG A SET OF MEDIA FILES STORED ON A USER EQUIPMENT

BACKGROUND

1. Field of the Disclosure

Embodiments relate to scanning a real-time media stream to detect one or more faces that are prevalent among a set of media files stored on a user equipment (UE).

2. Description of the Related Art

Certain user equipments (UEs) support facial recognition functionality. This facial recognition functionality can be used to scan media files (e.g., photos) stored on the respective UEs to detect faces. Then, if a particular person's face is detected across multiple media files, a face-specific media group for that particular person can be populated with the media files (e.g., photos, videos, etc.) having his/her face detected therein. Using a media gallery application, a user can filter media files by face, whereby folders representative of face-specific media groups are presented to the user for selection. If selected, the user can scroll through photos in the face-specific media group (e.g., each having a face of a particular user that defines the face-specific media group), view a slideshow showing the photos in the face-specific media group, or trigger the photos in the face-specific media group to be sent to an external entity (e.g., to another UE via text or email, posted to a social networking service such as Facebook, backed up to a file storage service such as Dropbox, etc.).

SUMMARY

An embodiment is directed to a method of operating a user equipment (UE), including recognizing a set of faces within a set of media files stored on the UE using facial recognition, identifying a set of prevalent faces based on a set of criteria including a prevalence of one or more faces among the set of media files, scanning real-time media using facial recognition to determine whether any prevalent faces from the set of prevalent faces are present in the real-time media, performing an action based on whether the scanning detects any prevalent faces from the set of prevalent faces in the real-time media, the action including adding one or more enhancement effects to the real-time media, authorizing a communicative operation to proceed, authorizing access to the UE, or any combination thereof.

Another embodiment is directed to a UE, including means for recognizing a set of faces within a set of media files stored on the UE using facial recognition, means for identifying a set of prevalent faces based on a set of criteria including a prevalence of one or more faces among the set of media files, means for scanning real-time media using facial recognition to determine whether any prevalent faces from the set of prevalent faces are present in the real-time media, means for performing an action based on whether the scanning detects any prevalent faces from the set of prevalent faces in the real-time media, the action including adding one or more enhancement effects to the real-time media, authorizing a communicative operation to proceed, authorizing access to the UE, or any combination thereof.

Another embodiment is directed to a UE, including at least one processor configured to recognize a set of faces within a set of media files stored on the UE using facial recognition, identify a set of prevalent faces based on a set of criteria including a prevalence of one or more faces among the set of media files, scan real-time media using facial recognition to determine whether any prevalent faces from the set of prevalent faces are present in the real-time media, perform an action based on whether the scanning detects any prevalent faces from the set of prevalent faces in the real-time media, the action including adding one or more enhancement effects to the real-time media, authorizing a communicative operation to proceed, authorizing access to the UE, or any combination thereof.

Another embodiment is directed to a non-transitory computer-readable medium containing instructions stored thereon, which, when executed by a UE, cause the UE to perform actions, the instructions comprising at least one instruction to cause the UE to recognize a set of faces within a set of media files stored on the UE using facial recognition, at least one instruction to cause the UE to identify a set of prevalent faces based on a set of criteria including a prevalence of one or more faces among the set of media files, at least one instruction to cause the UE to scan real-time media using facial recognition to determine whether any prevalent faces from the set of prevalent faces are present in the real-time media, at least one instruction to cause the UE to perform an action based on whether the scanning detects any prevalent faces from the set of prevalent faces in the real-time media, the action including adding one or more enhancement effects to the real-time media, authorizing a communicative operation to proceed, authorizing access to the UE, or any combination thereof.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
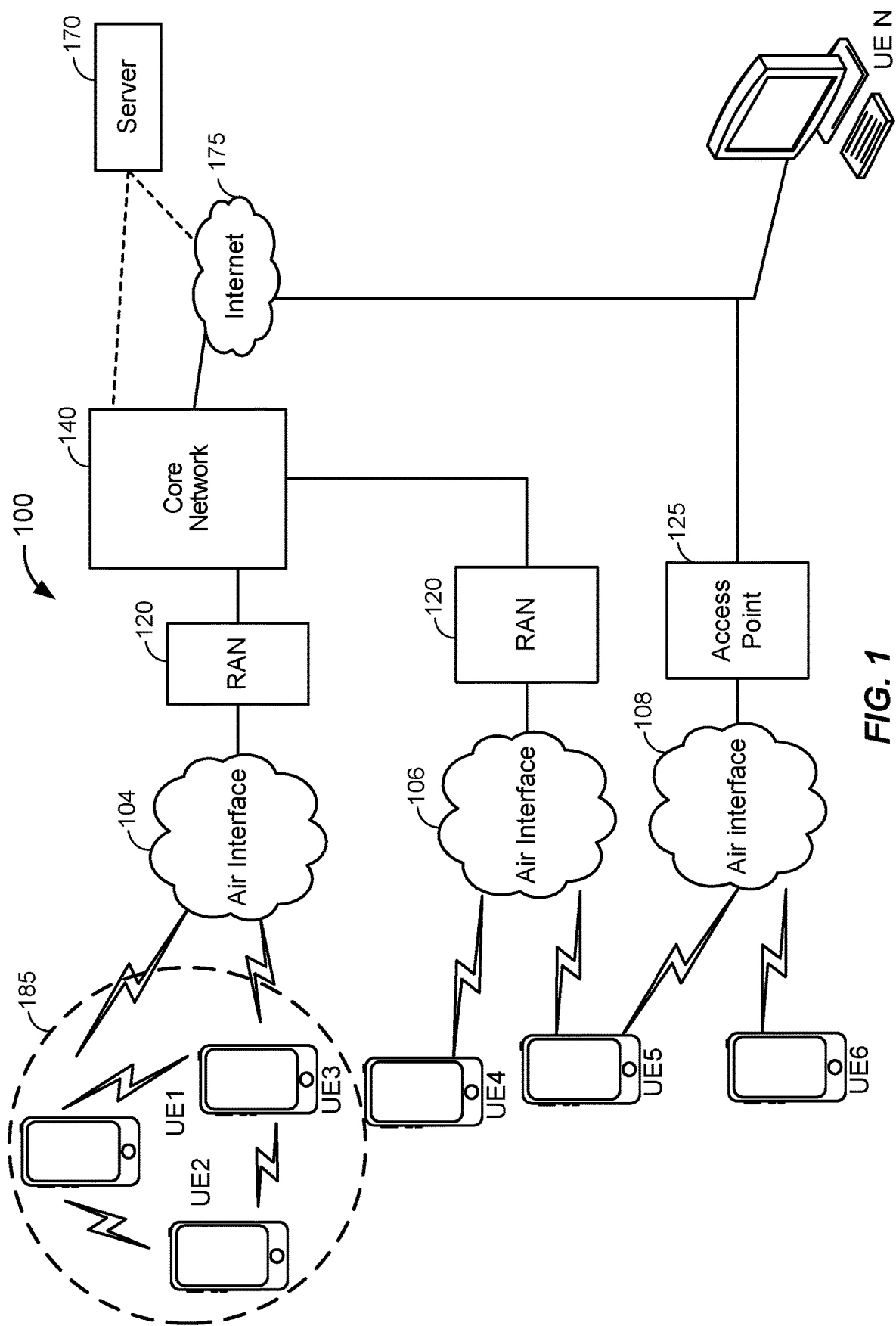
FIG. 1 illustrates a high-level system architecture of a wireless communications system in accordance with an embodiment of the disclosure.

Many UEs support playback of real-time media. For example, a UE equipped with a camera may enter a viewfinder mode, whereby a representation of visual media being captured by the camera is presented to the user (e.g., so that the user can orient the camera as desired to record photos and/or videos, etc.). In another example, the UE may playback real-time media that is received from an external device. In one example, the external device may be a media server that streams a real-time media feed to the UE (e.g., Facebook Live, etc.). In another example, the external device may be another UE that streams a real-time media feed to the UE in association with a video call (e.g., a Facetime call, a Google Duo call, etc.).

While certain UEs support facial recognition for the purpose of filtering or sorting media files in a media gallery application, facial recognition is not typically leveraged to facilitate functionality associated with real-time media playback. Accordingly, embodiments of the disclosure relate to recognizing faces in media files stored on a UE, identifying a set of prevalent faces based on their prevalence among the media files, and then using the identified set of prevalent faces to perform an action, as will be described below in more detail.

For example, if a prevalent face is detected in real-time media (e.g., in viewfinder mode, in an incoming video stream from a caller attempting to initiate a video call, a photo or video that is captured by the UE, etc.), the UE may add one or more enhancement effects to the real-time media (e.g., adding a visual artifact to the detected prevalent face within the real-time media, changing a color scheme associated with the real-time media, adding augmented reality information to the real-time media, auto-tracking, auto-focusing and/or zooming in upon the detected prevalent face within the real-time media, etc.), may authorize a communicative operation to proceed (e.g., authorize the video call, etc.) and/or may authorize access to the UE (e.g., unlocking the UE, etc.).

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples, includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, a social networking service, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2:
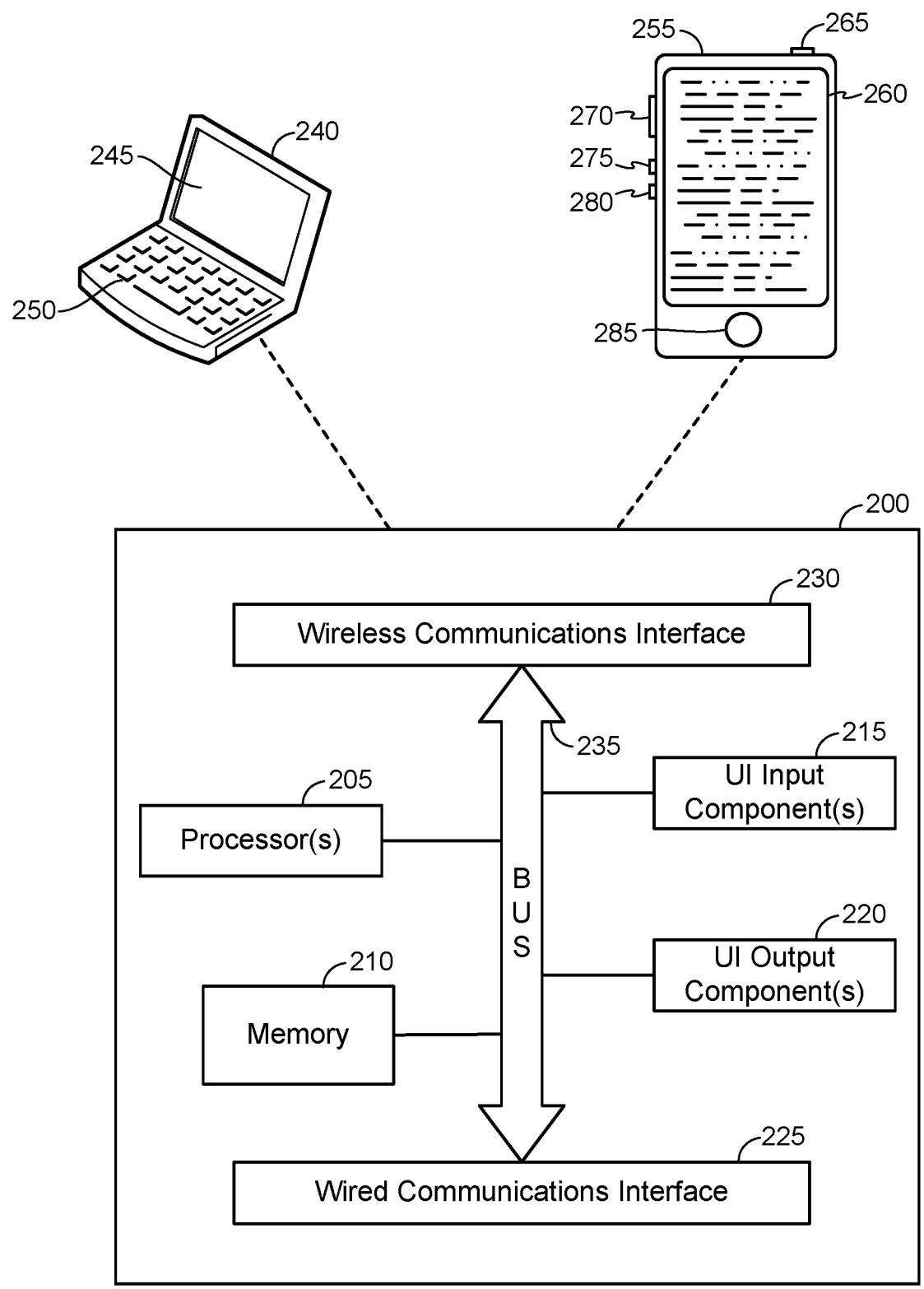
FIG. 2 illustrates a user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The memory 210 may include content (e.g., media files that can be accessed via a media gallery application), as well as various applications (e.g., a media gallery application, a facial recognition module, a media capture or camera application, one or more messenger or call applications, a web browser, a navigation or mapping application, etc.) that are executable by the one or more processors 205 via an associated operating system. The UE 200 also includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a USB connection, a mini USB, Firewire or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, LTE-D, Miracast, etc.). The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as a laptop 240 and a touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, satellite position system (SPS) antennas such as global positioning system (GPS) antennas, etc.).

The touchscreen device 255 is configured with a touchscreen display 260, peripheral buttons 265, 270, 275 and 280 (e.g., a power button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, SPS antennas (e.g., GPS antennas), and so on.

Figure 3:
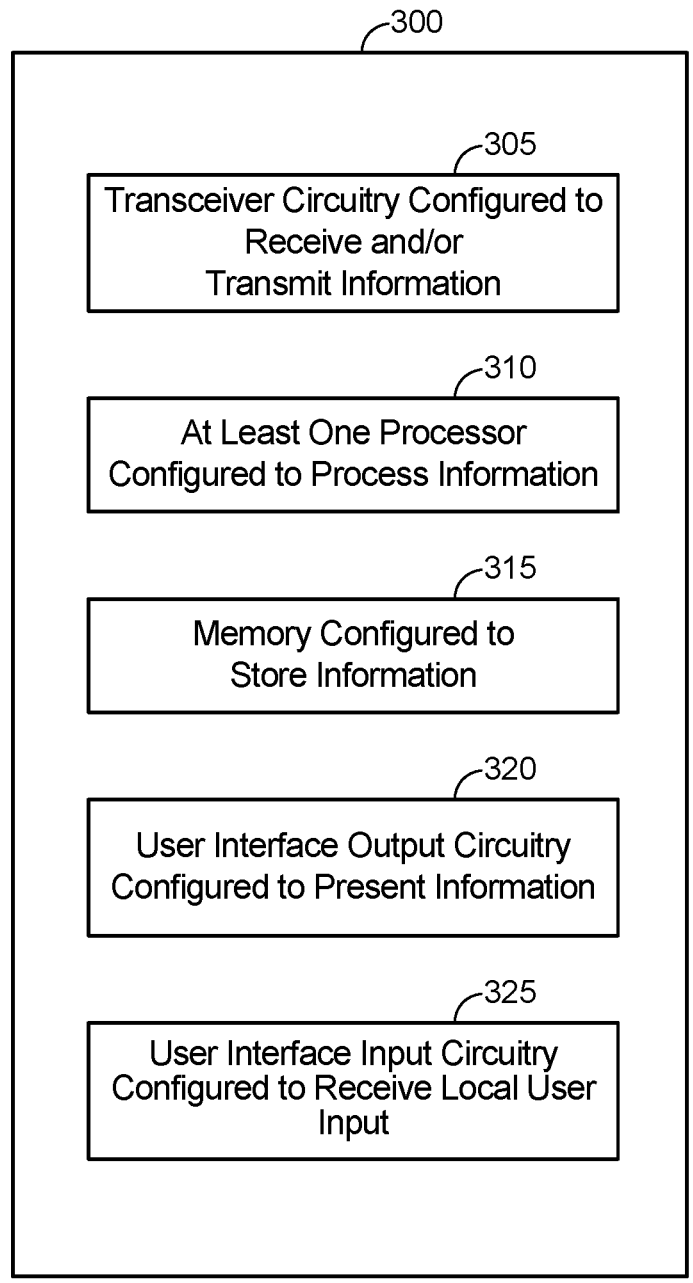
FIG. 3 illustrates a communications device that includes structural components in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UE 200.

Referring to FIG. 3, the communications device 300 includes transceiver circuitry configured to receive and/or transmit information 305. In an example, if the communications device 300 corresponds to a wireless communications device (e.g., UE 200), the transceiver circuitry configured to receive and/or transmit information 305 can include a wireless communications interface (e.g., Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB, Firewire or lightning connection, an Ethernet connection through which the Internet 175 can be accessed, etc.). In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200 as shown in FIG. 2, the user interface output circuitry configured to present information 320 can include a display such as display screen 245 or touchscreen display 260. The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For example, functions such as displaying, outputting, prompting, conveying, etc., may be performed by the user interface output circuitry configured to present information 320 in certain contexts as being specific types of presenting functions. Other functions that correspond to other types of presenting functions may also be performed by the user interface output circuitry configured to present information 320.

Referring to FIG. 3, the communications device 300 further includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200 as shown in FIG. 2, the user interface input circuitry configured to receive local user input 325 may correspond to UI area 250 or touchscreen display 260, etc. The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user input function. For example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 perform their respective functionality can overlap in part. For example, any software used to facilitate the functionality of the configured structural components of 305 through 325 can be stored in the non-transitory memory associated with the memory configured to store information 315, such that the configured structural components of 305 through 325 each perform their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Figure 4:
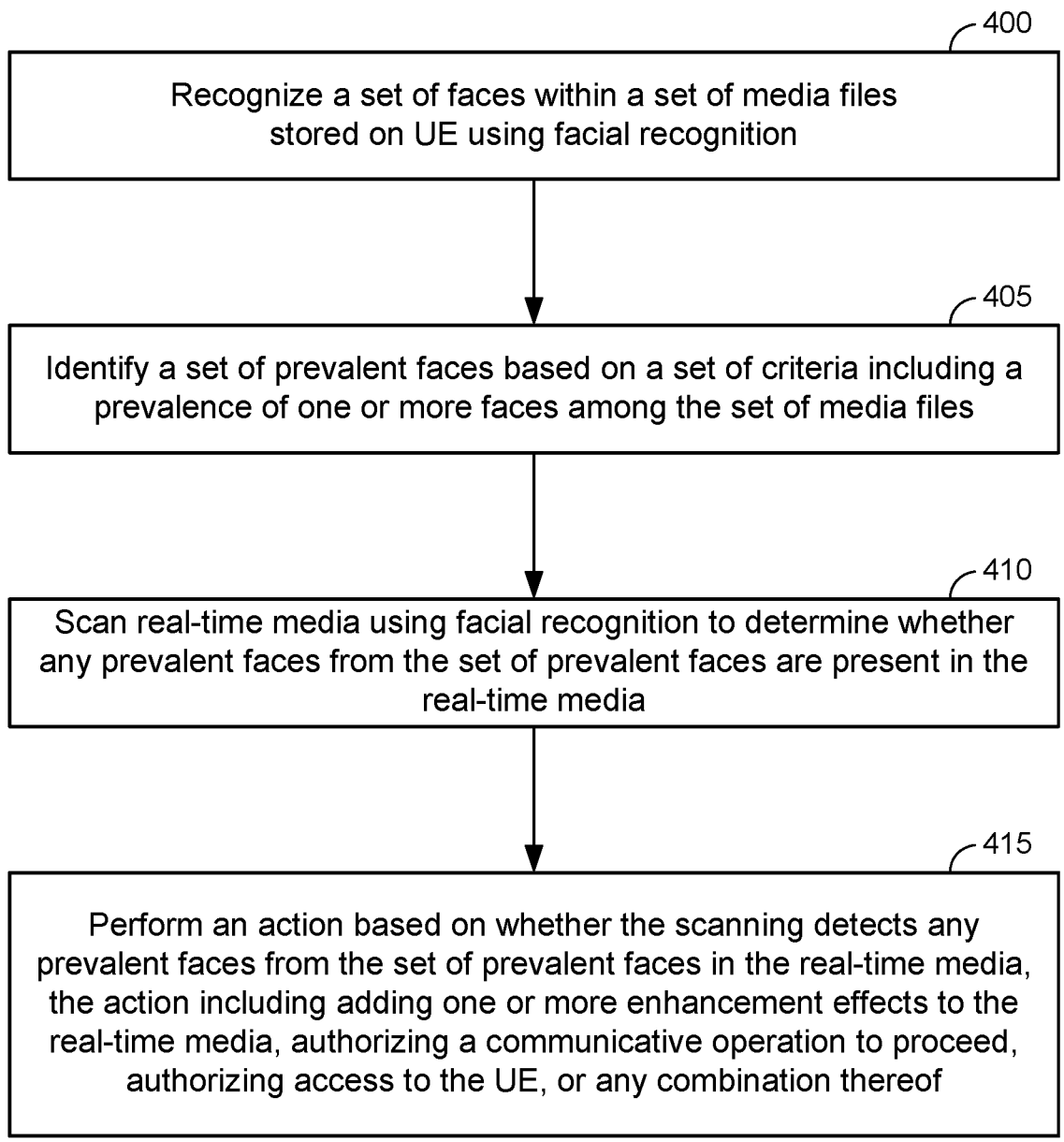
FIG. 4 illustrates a process of performing an action in association with a facial recognition scan of real-time media in accordance with an embodiment of the disclosure.

FIG. 4 illustrates a process of performing an action in association with a facial recognition scan of real-time media in accordance with an embodiment of the disclosure. The process of FIG. 4 is performed at a UE, such as the UE 200 of FIG. 2 in an example.

Referring to FIG. 4, at block 400, the UE recognizes a set of faces within a set of media files stored on the UE using facial recognition. In an example, the set of media files may correspond to media files (e.g., photos, videos, etc.) stored as part of a media gallery on the UE (e.g., all media files in the media gallery, a subset of media files that are part of a particular set of folders or albums within the media gallery, etc.). In another example, the set of media files may include one or more media files that are downloaded to the UE from a cloud storage service (e.g., Dropbox, Google Drive, etc.) that is accessible to the UE and/or a social networking service (e.g., Facebook, etc.) that is accessible to the UE. Further, the set of media files may include media files that are embedded within (or attached to) message correspondences associated with a messenger service (e.g., Email, SMS/MMS, iMessage, WhatsApp, Facebook Messenger, etc.). Accordingly, the set of media files stored on the UE can include media files that are captured locally on the UE, as well as media files downloaded to the UE from one or more external sources. The set of media files may be selected for facial recognition at block 400 by a user of the UE, or alternatively may be auto-selected by the UE (e.g., each media file added the media gallery and/or to a particular folder/album within the media gallery is scanned for facial recognition at a particular period or interval, when the media file is captured, when the media filed is downloaded, etc.). For example, the facial recognition of block 400 may be implemented via execution of a facial recognition module stored on the UE. In an example, the facial recognition module may be an independent application, part of an operating system of the UE, or integrated into a larger application (e.g., a media gallery application, etc.).

Referring to FIG. 4, at block 405, the UE identifies a set of prevalent faces based on a set of criteria including a prevalence of one or more faces among the set of media files. In an example, the set of criteria used to identify the set of prevalence faces at block 405 may include one or more ranking rules by which faces among the set of faces are ranked based at least in part by prevalence, or a prevalence threshold to be met for a face among the set of faces to qualify for the set of prevalent faces, or one or more secondary criteria by which a prevalence attribute of at least one face among the set of faces is weighted, or any combination thereof. The set of criteria may be default (or system-specified), user-specified (or customized), or a combination thereof (e.g., some criteria system-specified and other criteria user-specified). In a further example, the ruleset of criteria can change over time (e.g., based on user customization, via system updates, etc.).

Figure 5:
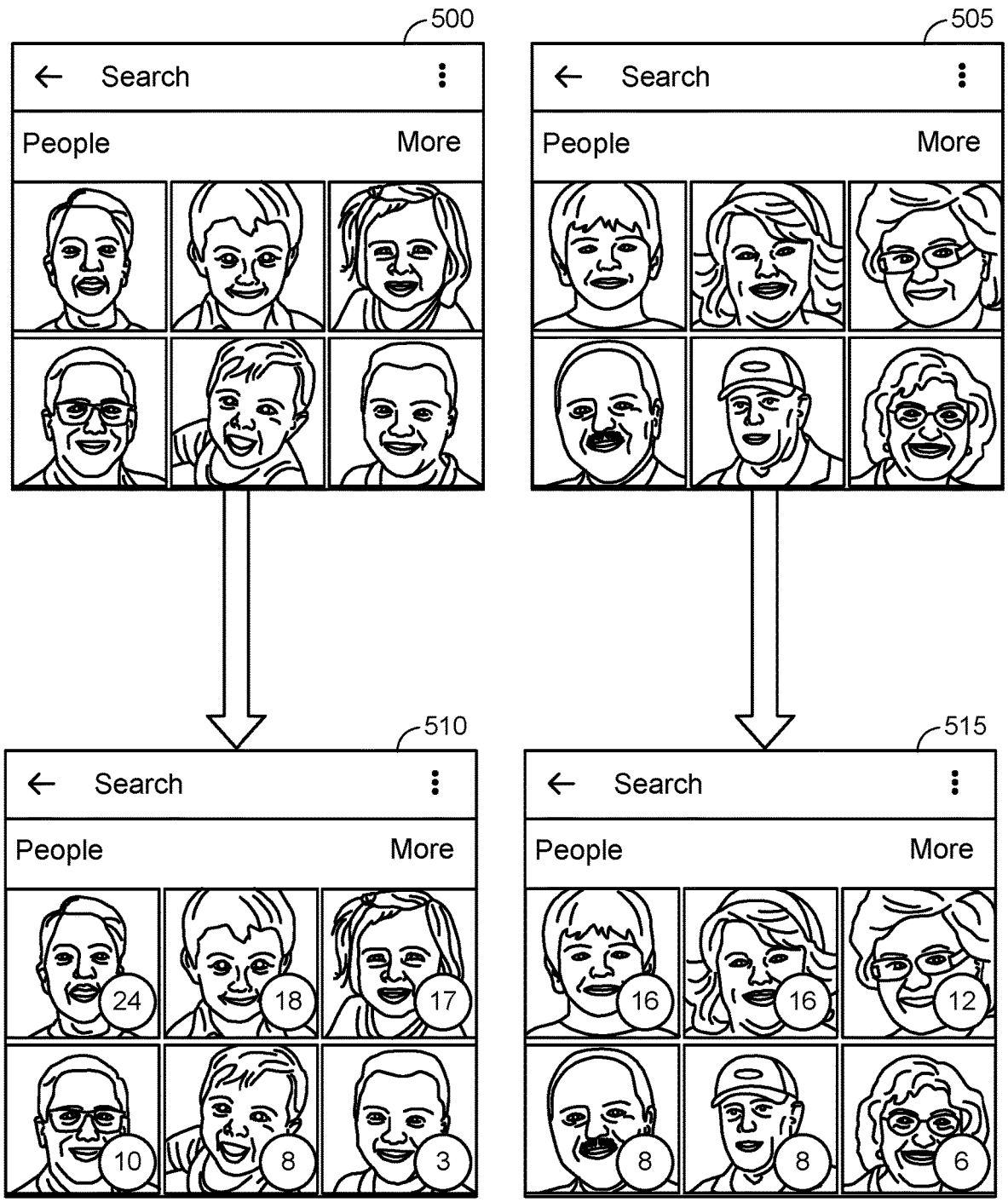
FIG. 5 illustrates screenshots depicting two different media galleries of two different UEs in "People" view, with each respective media gallery presenting six thumbnails that are representative of six different face-specific media groups, in accordance with an embodiment of the disclosure.

An example of blocks 400-405 is depicted in FIG. 5. In FIG. 5, screenshots 500 and 505 depict two different media galleries of two different UEs in "People" view, with each respective media gallery presenting six thumbnails that are representative of six different face-specific media groups. The formation of these face-specific media groups may occur as a result of block 400. Next, in screenshots 510 and 515, the six thumbnails representing the six different face-specific media groups are presented in association with a prevalence score that is based on the prevalence of each face among the media files stored on the respective UEs. In an example, the prevalence score can correspond to a simple or "unweighted" count of the number of media files that include the face that defines a particular face-specific media group (or the number of media files in the face-specific media group), or alternatively to a "weighted" prevalent score (e.g., weighted based on one or more secondary criteria among the set of criteria, as will be discussed below in more detail). While screenshots 510 and 515 depict the prevalence score as an actual on-screen numerical representation, in other embodiments the prevalence score can be determined at a respective UE without being visually presented to the user, or conveyed in a non-numerical manner (e.g., the arrangement or order of the representative thumbnails may be configured to convey the prevalence score, such as by placing the thumbnail for the face-specific media group with the highest prevalence score in the top-left position, and so on). Also, it will be appreciated that a picture with multiple faces may be part of multiple face-specific media groups and thereby contribute to the prevalence scores of each of the multiple faces. Further, blocks 400-405 may repeat either in a periodic (e.g., every day, every week, etc.) or an event-triggered manner (e.g., each time a new media file is stored on the UE or an existing media file is modified or deleted, each time a new facial recognition module becomes available to the UE, whenever the set of criteria used at block 405 is modified by the system or manually by the user of the UE, or any other event that has the potential to change a face prevalence score).

In one example, the prevalence scores may be ranked to populate the set of prevalent faces at block 405 (e.g., the faces ranked in the highest 35% based on prevalence score are added to the set of prevalent faces, the top 10 faces based on prevalence score are added to the set of prevalent faces, etc.). In another example, any face with a prevalence score above a prevalence threshold (e.g., 10, 15, etc.) may be added to the set of prevalence faces at block 405. In an example, the ranking rules and/or prevalence threshold may be system-specified or user-specified.

Further, face-prevalence among the set of media files may be only one of a plurality of criteria that factor into the set of criteria used at block 405 to determine the set of prevalent faces. Accordingly, in addition to face-prevalence, secondary criteria (e.g., facial criteria and/or file metadata criteria) may be used to weight the prevalence score associated with a particular face in accordance with the one or more prevalence score weighting rules. Examples of facial criteria for weighting of a face prevalence score may include any of the following:

Time Lapse (e.g., an amount of time elapsed since media files containing the at least one face were captured, added to the UE and/or accessed on the UE, etc.). Generally, a longer time lapse may function to decrease the associated prevalence score;

Age (e.g., baby, youth, teen, adult, older, etc.);

Mood (e.g., happy, sad, angry, excited, etc.);

Expression (e.g., duckface, smiling, clowning, stoic, etc.);

Gender (e.g., male, female, etc.);

Facial symmetry (e.g., low, high, medium);

Face Shape (e.g., round, oval, heart, square, etc.);

Adornments/Accessories (e.g., glasses, moustache, beard, makeup, hair, jewelry, etc.); and/or Size/Focus (e.g., full frame, background, secondary).

Examples of file metadata criteria for weighting of a face prevalence score may include any of the following:

Frequency (e.g., low, medium, high). For example, user 1 operating UE 1 may visit user 2 twice a year and take many pictures of user 2 during each visit. In this case, the frequency would be low (i.e., twice a year), with images being clustered around the visits. In another example, user 1 is roommates with user 3. In this case, users 1 and 3 would be expected to interact frequently, such that a frequency of user 3's face appearing in user 1's pictures is likely to be high;

Similarity (e.g., low, medium, high). For example, user 1 operating UE 1 may take 10 pictures back-to-back trying to get one good picture of a particular face. In this case, the similarity of these 10 pictures is high. High similarity may de-weight the prevalence score of an associated face (e.g., so that user 1's 10 back-to-back pictures do not have the weight of 10 pictures, as user 1's goal was only to obtain one good picture).

Shareability (e.g., low, medium, high). For example, assume face 1 belongs to user 1's baby. User 1 posts a high number of pictures containing face 1 to social media (e.g., Facebook), such that the shareability of face 1 is high. In a further example, face 2 belongs to a colleague of user 1. User 1 does not share any pictures with face 2, such that the shareability of face 2 is low.

Deletion (e.g., low, medium, high). For example, user 1 operating UE 1 may be dating user 2 and thereby have a high number of pictures with user 2 giving user 2 a high prevalence score. However, users 1 and 2 then break up, with user 1 deleting user 2's pictures as user 1 comes across them. This may cause a deletion rate associated with user 2's face to be high, which can lower the prevalence score of user 2's face.

Location (e.g., same place, new place, far place, etc.). For example, multiple pictures captured in the same place may be less relevant than pictures captured in different places (e.g., which may imply that the respective users are going on trips together and have a close relationship). Accordingly, the multiple pictures with the same face in the same place may have the effect of lowering an associated face prevalence score, while pictures with the same face occurring in a variety of places may have the effect of increasing an associated face prevalence score.

It will be appreciated that some of the above-noted factors rely upon a visual image inspection (e.g., detecting a gender of a face, a predicted age of the face, whether the face has a beard, etc.), which can be a feature built into the facial recognition module in an example. Other of the above-noted factors may rely upon file-specific metadata (e.g., a geotagged photo location, etc.), system information (e.g., a history of when particular files were deleted, etc.) or communicative history information (e.g., whether particular files shared with a social network, etc.). This type of information need not be collected by the facial recognition module itself, but rather by an application that performs the identification at block 405 via coordination with one or more other system components (e.g., the application queries the operating system to receive system information, etc.), as will be appreciated by one of ordinary skill in the art.

Referring to FIG. 4, the facial recognition at block 400 and the identification of block 405 may occur without associating the set of faces with a corresponding set of user identities. Consider the scenario where the set of faces includes Face 1, which happens to correspond to Contact 1 from a contact book maintained at the UE. The process of FIG. 4 is not dependent upon the UE being able to correlate Face 1 to Contact 1 (although in theory face-to-user-identity correlation is possible, either by defining a facial signature for the contact via a profile picture or based on manual input from the user of the UE). Accordingly, some or all of the face-specific media groups can be generated and used during the process of FIG. 4 without the UE being able to identity a unique user that having the face associated with a particular face-specific media group. This is in contrast to certain facial recognition systems (e.g., such as those used by social networking services) whereby any face detected in a newly obtained photo is compared with a facial signature that is defined for a particular user identity (e.g., a particular Facebook user profile, etc.). Hence, while the process of FIG. 4 could theoretically be implemented by a server with access to vast user identity information, the process of FIG. 4 can also be implemented in a distributed manner by UEs that do not have access to such information. In this case, the process of FIG. 4 can still be used at these distributed UEs because explicit user identity correlation to detected facial signatures is not expressly required.

Referring to FIG. 4, at some point after the identification at block 405, at block 410, the UE scans real-time media using facial recognition to determine whether any prevalent faces from the set of prevalent faces identified at block 405 are present in the real-time media. As noted above, a prevalent face can correspond to any face that is highly-ranked based on face prevalence (e.g., among the top 10 faces by prevalence, etc.), with a prevalence score above a prevalence score threshold, or any combination thereof.

Further, the real-time media that is scanned at block 410 can be obtained by the UE from a variety of sources. In an example, these sources may include a camera of the UE, whereby the real-time media may correspond to a video feed being captured by the camera (e.g., in viewfinder mode, potentially while the user of the UE is entering commands to record particular portions of the video feed as pictures and/or video). In an alternative example, these sources may include one or more sources external to the UE, such as from an external server (e.g., server 170, etc.) or an external UE (e.g., a video call, etc.).

Referring to FIG. 4, at block 415, the UE performs an action based on whether the scanning detects any prevalent faces in the real-time media. In particular, the action performed at block 415 includes adding one or more enhancement effects to the real-time media, authorizing a communicative operation to proceed, authorizing access to the UE, or any combination thereof. Example implementations of block 415 will be described in more detail below.

Still referring to FIG. 4, the facial recognition at block 400 and the identification of block 405 may occur without associating the set of faces with a corresponding set of user identities. Consider the scenario where the set of faces includes Face 1, which happens to correspond to Contact 1 from a contact book maintained at the UE. The process of FIG. 4 is not dependent upon the UE being able to correlate Face 1 to Contact 1 (although in theory face-to-user-identity correlation is possible, either by defining a facial signature for the contact via a profile picture or based on manual input from the user of the UE). Accordingly, some or all of the face-specific media groups can be generated and used during the process of FIG. 4 without the UE being able to identity a unique user that having the face associated with a particular face-specific media group. This is in contrast to certain facial recognition systems (e.g., such as those used by social networking services) whereby any face detected in a newly obtained photo is compared with a facial signature that is defined for a particular user identity (e.g., a particular Facebook user profile, etc.). Hence, while the process of FIG. 4 could theoretically be implemented by a server with access to vast user identity information, the process of FIG. 4 can also be implemented in a distributed manner by UEs that do not have access to such information. In this case, the process of FIG. 4 can still be used at these distributed UEs because explicit user identity correlation to detected facial signatures is not expressly required.

Figure 6:
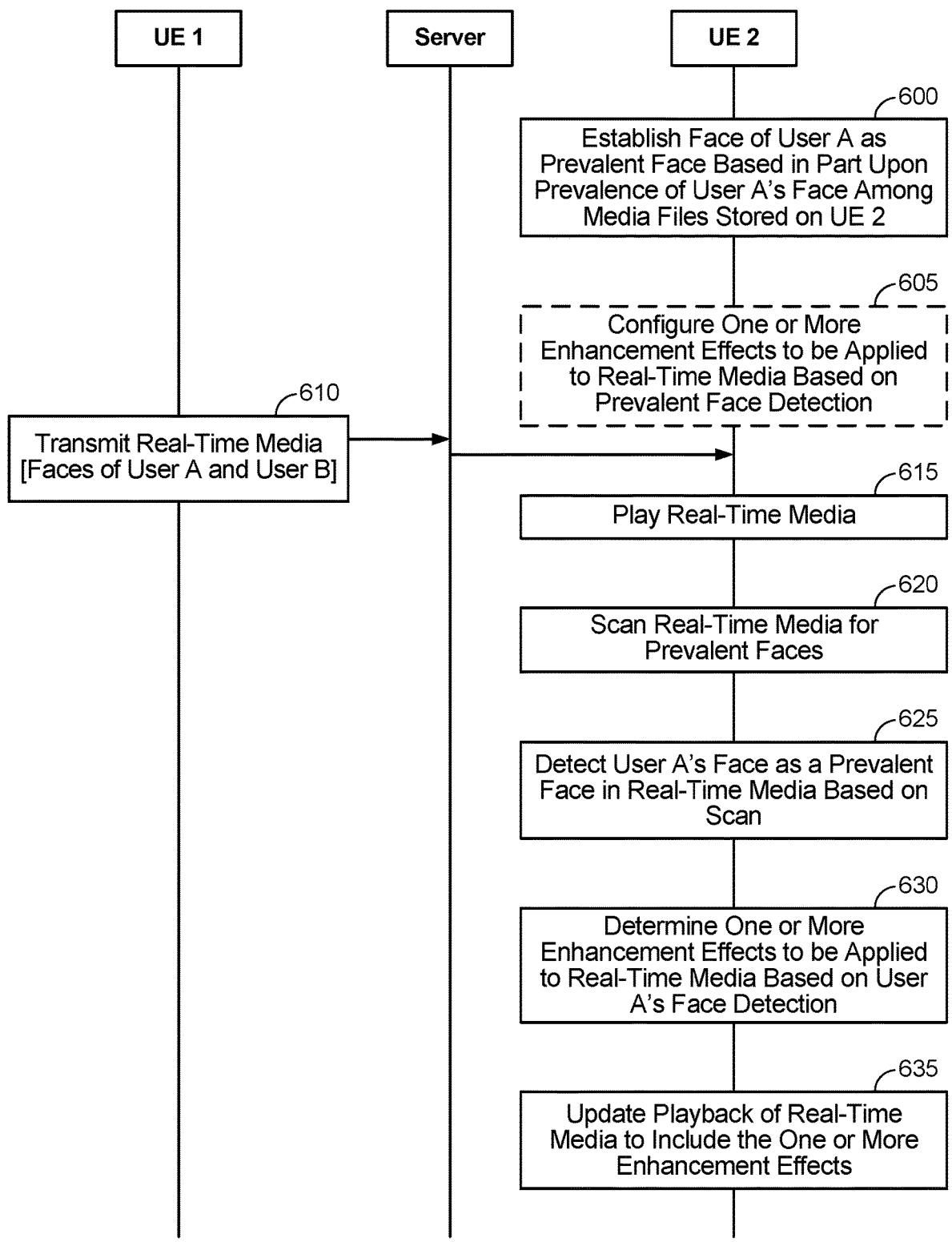
FIG. 6 illustrates an example implementation of the process of FIG. 4 in accordance with an embodiment of the disclosure.

FIG. 6 illustrates an example implementation of the process of FIG. 4 in accordance with an embodiment of the disclosure. In particular, FIG. 6 describes an example whereby the action performed at block 415 of FIG. 4 is the addition of one or more enhancement effects to the real-time media.

Referring to FIG. 6, at block 600, assume that the face of User A is established as a prevalent face based in part upon a prevalence of User A's face among media files stored on UE 2. In an example, block 600 may occur as a result of execution of blocks 400-405 of FIG. 4. At block 605, UE 2 optionally configures (e.g., based on user input, based on default system or application-specific settings, etc.) one or more enhancement effects to be applied to real-time media based on prevalent face detection (e.g., detection of User A's face or some other prevalent face). In an example, block 605 is optional because the configuring of block 605 occurs before any real-time media is actually being played on UE 2, and it is possible that the configuring of enhancement effects can occur later (e.g., after real-time media is obtained for playback).

Referring to FIG. 6, at some later point in time, at block 610, UE 1 transmits media to a server, which is then streamed to UE 2. In an example, the server may be a social networking server, whereby UE 1 is posting the real-time media to the social networking server, and UE 2 is a friend of UE 1 who is tuning into the stream of real-time media from UE 1 via the social networking server. In another example, the server may be a video call hosting server that is arbitrating a streaming video session (or call) between UEs 1 and 2 (and potentially other UEs as well). In this case, while not shown, UE 2 may also be streaming its own video feed back to UE 1 as well. Further, while FIG. 6 is directed to a server-arbitrated exchange of real-time media from UE 1 to UE 2, in other embodiments the exchange of the real-time media need not be server arbitrated and could instead be conducted via a D2D protocol and/or a local wireless video streaming protocol (e.g., Miracast, etc.).

Referring to FIG. 6, at block 615, UE 2 receives and plays the real-time media (e.g., via a display device integrated into and/or coupled to UE 2). At block 620, UE 2 scans the real-time media to detect any prevalent faces (e.g., as in block 410 of FIG. 4). More specifically, the scanning of block 620 applies facial recognition one or more individual video frames within the real-time media for comparison against a set of faces that have been designated as being prevalent, such as the designation of User A's face at block 600. In the embodiment of FIG. 6, assume that one or more video frames being scanned at block 620 include the faces of User A and User B, where User B is not a prevalent face. Under this assumption, at block 625, UE 2 detects the faces of Users A and B in the one or more video frames of the real-time media based on the scan of block 620. In an example, the detection of User B's face is effectively ignored (at least, for the purpose of applying enhancement effect(s)), while the detection of User A's face at block 625 triggers recognition of User A's face as a prevalent face based on block 600.

Based on the detection of User A's face as a prevalent face at block 625, UE 2 determines one or more enhancement effects to be applied to the real-time media at block 630. In an example, the determination of block 630 can correspond to loading the preconfigured enhancement effect(s) from optional block 605. In an alternative example, the user of UE 2 may be prompted with various enhancement effect options to choose to apply to the real-time media. After the enhancement effect(s) are determined at block 630, UE 2 updates the playback of the real-time media to include the enhancement effect(s) at block 635 (e.g., as in block 415 of FIG. 4).

Figure 7A:
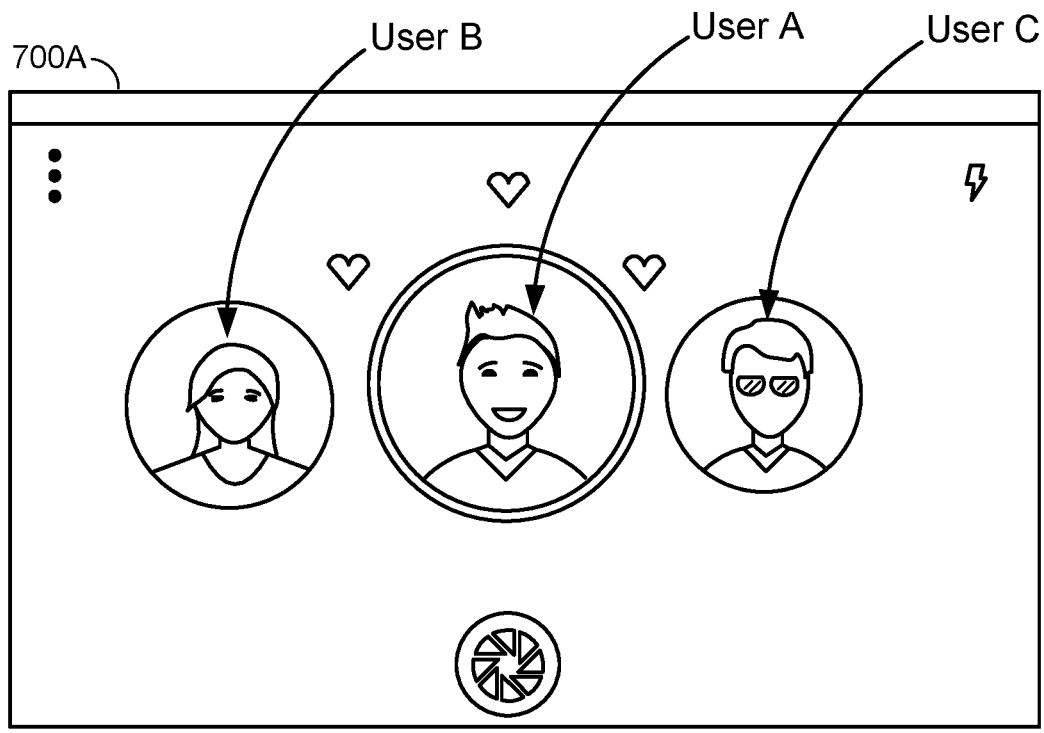
FIG. 7A illustrates a screenshot whereby User A is ringed with hearts in accordance with an embodiment of the disclosure.
Figure 7B:
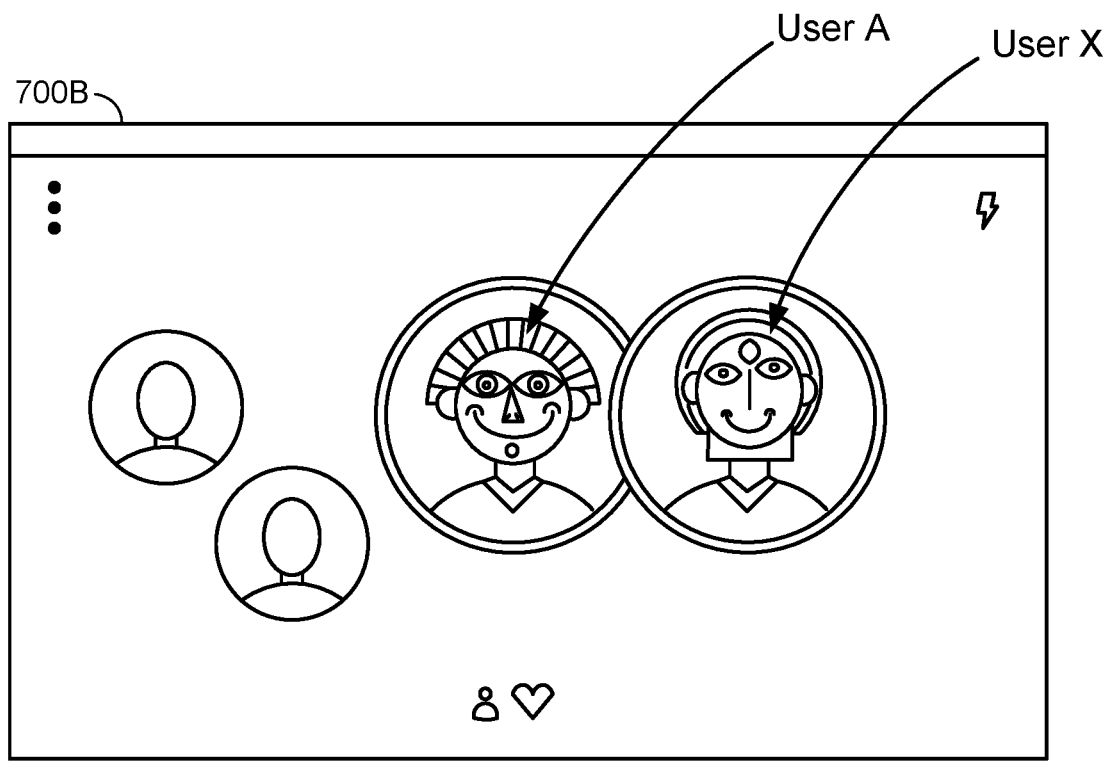
FIG. 7B illustrates a screenshot whereby the faces of Users A and X are depicted with goofy masks in accordance with an embodiment of the disclosure.

Examples of the enhancement effect(s) that may be applied to the real-time media in the embodiment of FIG. 6 may include any of the following:

Adding a visual artifact (e.g., a beard, glasses, a fake nose, a princess tiara, a Chewbacca visage, a Zombie effect, an extreme aging effect, modifying sizes of facial features such as a nose, eyes, mouth or ears, etc.) to the face of User A. For example, User A may be ringed with hearts as shown via screenshot 700A in FIG. 7A, while the faces of Users A and X (where the face of User X is another prevalent face) are depicted with goofy masks in screenshot 700B of FIG. 7B. In a further example, the visual artifact may be selected based on secondary information such as a location of UE 1 and/or UE 2 (e.g., if UE 1 is capturing the real-time media at Disney World, then the visual artifacts added to the face of User A may be Disney-related, such as giving the face of User A Mickey Mouse's ears, etc.);

Changing a color scheme associated with the real-time media generally or specifically in relation to User A or the face of User A. For example, User A may be shown in-color, while the remainder of the real-time media is changed to black-and-white, as shown via screenshot 700A in FIG. 7A.

Figure 7C:
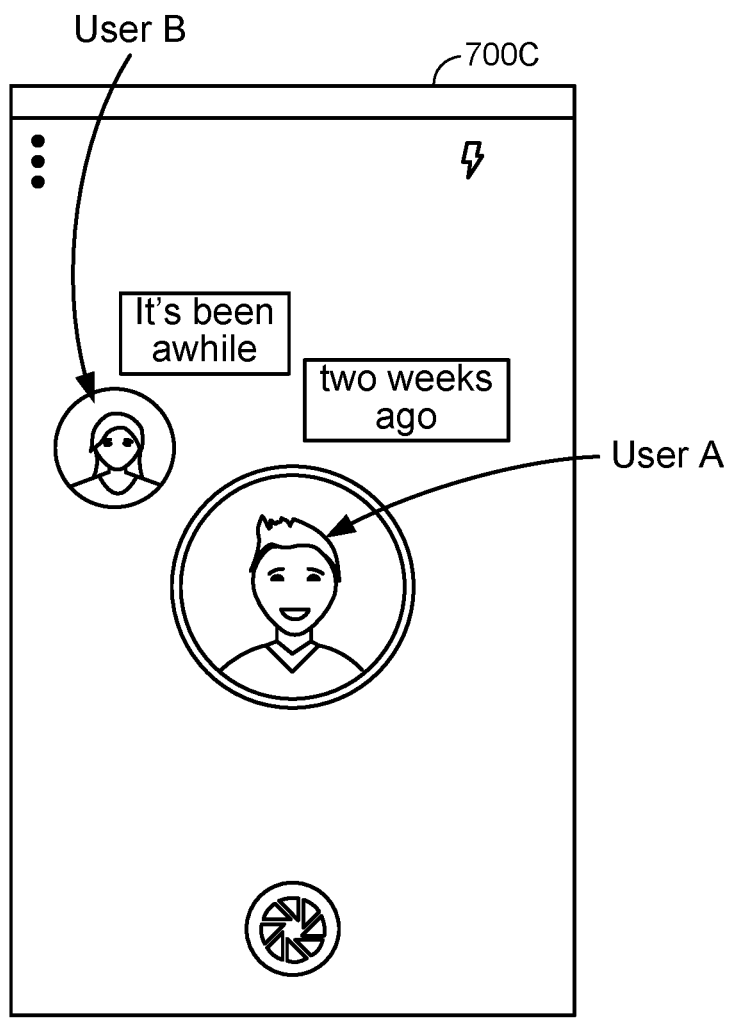
FIG. 7C illustrates a screenshot whereby the face of Users A and B are associated with indications of the time and/or location at which a most recent media file containing their respective faces were captured in accordance with an embodiment of the disclosure.

Adding augmented reality information to the real-time media. For example, an indication of the time and/or location at which a most recent media file containing the face of User A was captured from the media files stored on UE 2 may be overlaid onto the real-time media, as shown via screenshot 700C in FIG. 7C; and/or Auto-tracking, auto-focusing or zooming-in upon prevalent faces. For example, the auto-focusing may modify lens operation of UE 2 so that a lens focus is centered on a prevalent face. The auto-tracking and/or zoom functionality may occur via lens manipulation, or occur digitally, or a combination of both. In a further example, the mood of the prevalent face can also be used as a filter (e.g., so that the auto-tracking, auto-focusing and/or zoom-in functions occur with respect to prevalent faces with happy expressions and opposed to unhappy expressions).

Figure 8:
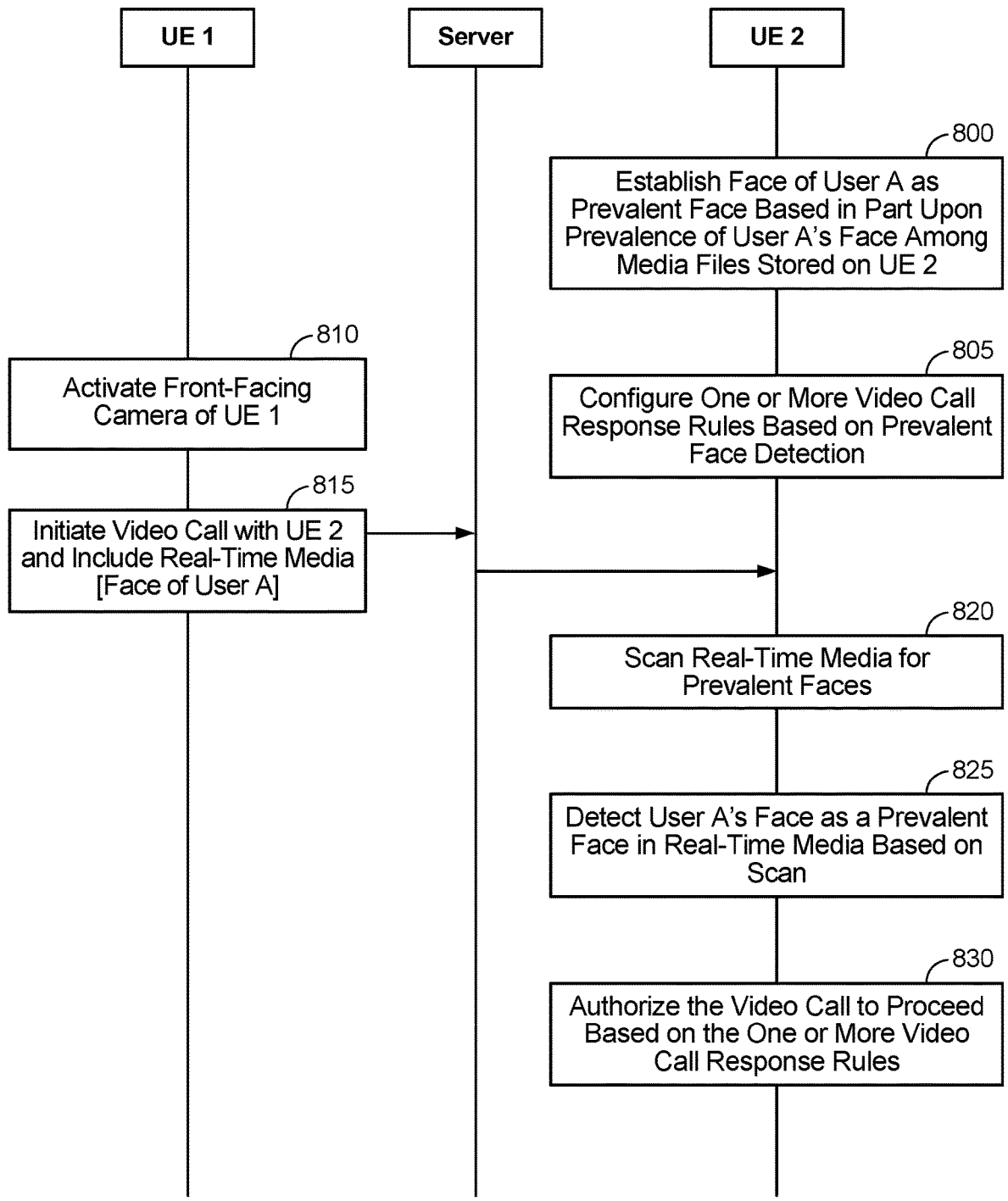
FIG. 8 illustrates an example implementation of the process of FIG. 4 in accordance with another embodiment of the disclosure.

FIG. 8 illustrates an example implementation of the process of FIG. 4 in accordance with another embodiment of the disclosure. In particular, FIG. 6 describes an example whereby the action performed at block 415 of FIG. 4 is the authorization of a video call (i.e., a communicative operation).

Referring to FIG. 8, at block 800, assume that the face of User A is established as a prevalent face based in part upon a prevalence of User A's face among media files stored on UE 2. In an example, block 800 may occur as a result of execution of blocks 400-405 of FIG. 4. At block 805, UE 2 configures (e.g., based on user input, based on default system or application-specific settings, etc.) one or more video call response rules based on prevalent face detection (e.g., detection of User A's face or some other prevalent face).

Referring to FIG. 8, assume that User A is operating UE 1. At some later point in time, at block 810, User A determines to initiate a video call with UE 2, which triggers activation of a front-facing camera of UE 1. UE 1 then initiates the video call with UE 2 at block 815 by sending a call request to a server (e.g., a video call hosting server configured to mediate Facetime calls, Skype video calls, etc.) along with real-time media including the video feed being captured by the front-facing camera of UE 1, which is then forwarded to UE 2. In the embodiment of FIG. 8, assume that User A orients the front-facing camera such that the face of User A is contained in the video feed. While FIG. 8 is directed to a server-arbitrated video call between UEs 1 and 2, in other embodiments the exchange of the real-time media need not be server arbitrated and could instead be conducted via a D2D protocol and/or a local wireless video streaming protocol (e.g., Miracast, etc.).

Referring to FIG. 8, at block 820, UE 2 scans the real-time media (e.g., the video feed captured by the front-facing camera of UE 1) to detect any prevalent faces (e.g., as in block 410 of FIG. 4). More specifically, the scanning of block 620 applies facial recognition one or more individual video frames within the real-time media for comparison against a set of faces that have been designated as being prevalent, such as the designation of User A's face at block 800. In the embodiment of FIG. 8, assume that one or more video frames being scanned at block 820 include the face of User A. Under this assumption, at block 825, UE 2 detects the face of User A in the one or more video frames of the real-time media based on the scan of block 820. In an example, the detection of User A's face at block 825 triggers recognition of User A's face as a prevalent face based on block 800.

Based on the detection of User A's face as a prevalent face at block 825, UE 2 authorizes the video call to proceed based on the one or more video call response rules at block 830. Examples of video call response rules may include any of the following:

Example Video Call Response Rule #1: If an announcement of a video call is received in conjunction with real-time media that includes a prevalent face, then the video call is auto-accepted. Otherwise, announce the video call to permit a user to manually decide whether or not to accept the video call. In this case, because the real-time media received with the announcement of the video call includes the prevalent face of User A in the embodiment of FIG. 8, the authorization of block 830 permits the video call to proceed by auto-accepting the video call.

Example Video Call Response Rule #2: If an announcement of a video call is received in conjunction with real-time media that includes a prevalent face, then announce the video call to permit a user to manually decide whether or not to accept the video call. Otherwise, block the video call altogether without notifying the user. In this case, because the real-time media received with the announcement of the video call includes the prevalent face of User A in the embodiment of FIG. 8, the authorization of block 830 permits the video call to proceed by announcing the video call to the user to prompt a manual call accept/rejection decision.

Example Video Call Response Rule #3: If an announcement of a video call is received in conjunction with real-time media that includes a prevalent face, then announce the video call to permit a user to manually decide whether or not to accept the video call in conjunction with a high-volume, urgent ringtone. Otherwise, announce the video call to permit the user to manually decide whether or not to accept the video call in conjunction with a low-volume non-urgent ringtone. In this case, because the real-time media received with the announcement of the video call includes the prevalent face of User A in the embodiment of FIG. 8, the authorization of block 830 permits the video call to proceed with a call announcement using the high-volume, urgent ringtone.

As will be appreciated, performing a video call response action based on one or more video call response rules as described with respect to FIG. 8 is merely one example of how an action of authorizing a communicative operation to proceed at block 415 may be implemented. Other embodiments need not relate to video calls. For example, User A may want to email User B via a UE, but the email function is locked. To unlock (or authorize) the email function, User A may be required to activate a front-facing camera so that the UE can verify his/her face as a prevalent face before the email function is unlocked. Other example communicative functions include texting, uploading or downloading a file, logging onto a social networking site, and so on. Accordingly, FIG. 8 is provided for example purposes, and not to limit the communicative operation that may be authorized at block 415 to a video call implementation.

Figure 9A:
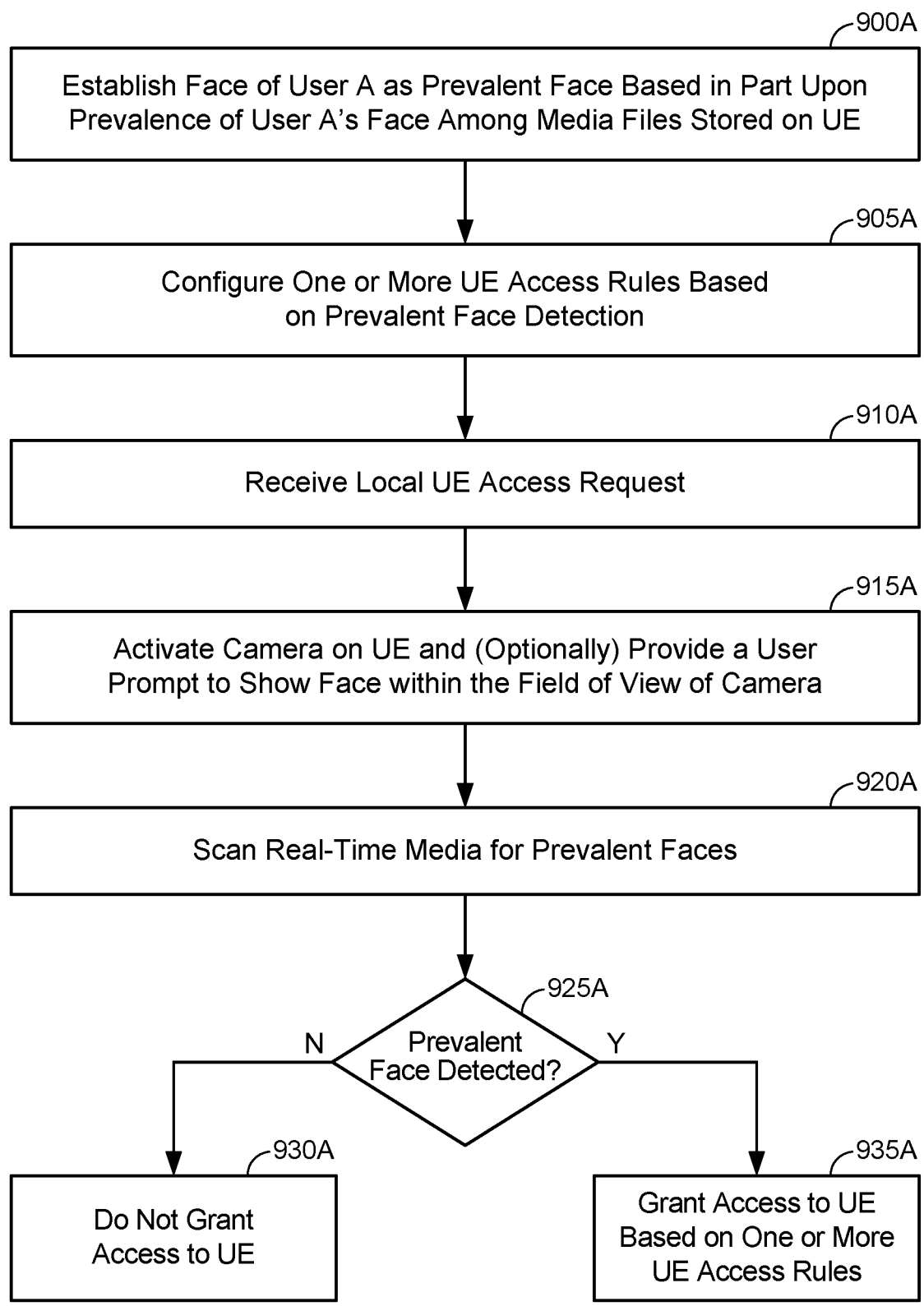
FIG. 9A illustrates an example implementation of the process of FIG. 4 in accordance with another embodiment of the disclosure.

FIG. 9A illustrates an example implementation of the process of FIG. 4 in accordance with another embodiment of the disclosure. In particular, FIG. 9A describes an example whereby the action performed at block 415 of FIG. 4 is selective authorization of local access to the UE.

Referring to FIG. 9A, at block 900A, assume that the face of User A is established as a prevalent face based in part upon a prevalence of User A's face among media files stored on a given UE. In an example, block 900A may occur as a result of execution of blocks 400-405 of FIG. 4. At block 905A, the given UE configures (e.g., based on user input, based on default system or application-specific settings, etc.) one or more local UE access rules based on prevalent face detection (e.g., detection of User A's face or some other prevalent face).

Referring to FIG. 9A, at block 910A, the given UE receives a local UE access request. In an example, the local UE access request at block 910A can be received as user input in the form of a verbal command, a mouse-click, a touchscreen input, a keyboard input or other type of button push, and so on. In response to the local UE access request at block 910A, the given UE activates a camera at block 915A (e.g., an integrated front or rear-facing camera on the UE, a camera coupled to the given UE via a USB or other cabled connection, a camera wirelessly connected to the given UE, etc.) and optionally prompts the user of the given UE to show his/her face within the field of view of the camera (e.g., by entering viewfinder mode so the user can orient the camera and/or his/her position so the user's face is visible via the viewfinder). In an example, the local UE access request at block 910A may occur implicitly when the user activates the camera (e.g., the user places the given UE into viewfinder mode, which is interpreted as a local UE access request if the user's face can be verified as a prevalent face), in which case blocks 910A and 915A are consolidated into a single operation as opposed to the camera activation being triggered in response to a separate local UE access request.

Referring to FIG. 9A, at block 920A, the given UE scans the real-time media (e.g., the video feed captured by the camera) to detect any prevalent faces (e.g., as in block 410 of FIG. 4). More specifically, the scanning of block 920A applies facial recognition one or more individual video frames within the real-time media for comparison against a set of faces that have been designated as being prevalent, such as the designation of User A's face at block 900A. At block 925A, the given UE determines whether any prevalent faces are detected based on the scan of block 920A. If a prevalent face is not detected in the real-time media at block 925A, then the local UE access request is denied at block 930A. Otherwise, if a prevalent face is detected in the real-time media at block 925A (e.g., such as the face of User A based on the earlier execution of block 900A), then the local UE access request is granted at block 935A in accordance with the one or more local UE access rules configured at block 905A.

Examples of local UE access rules may include any of the following:

Local UE Access Rule Example #1: If a prevalent face is detected at block 925A, then grant the user limited access to the face-specific media group associated for the prevalent face (e.g., so that the user can access his/her relevant pictures and/or videos on the given UE);

Local UE Access Rule Example #2: If a prevalent face is detected at block 925A, then permit the given UE to be unlocked;

Local UE Access Rule Example #3: If a prevalent face is detected at block 925A, then permit the user limited access to use a particular application (e.g., a media gallery application, a social networking application, etc.) and/or a particular application mode (e.g., guest mode, administrative mode, etc.); and/or Local UE Access Rule Example #4: If a prevalent face is detected at block 925A, then permit the user limited access to change one or more operating parameters of the given UE via a configuration utility (e.g., whether parental controls are activated, screen brightness, whether cellular roaming is permitted, etc.).

Figure 9B:
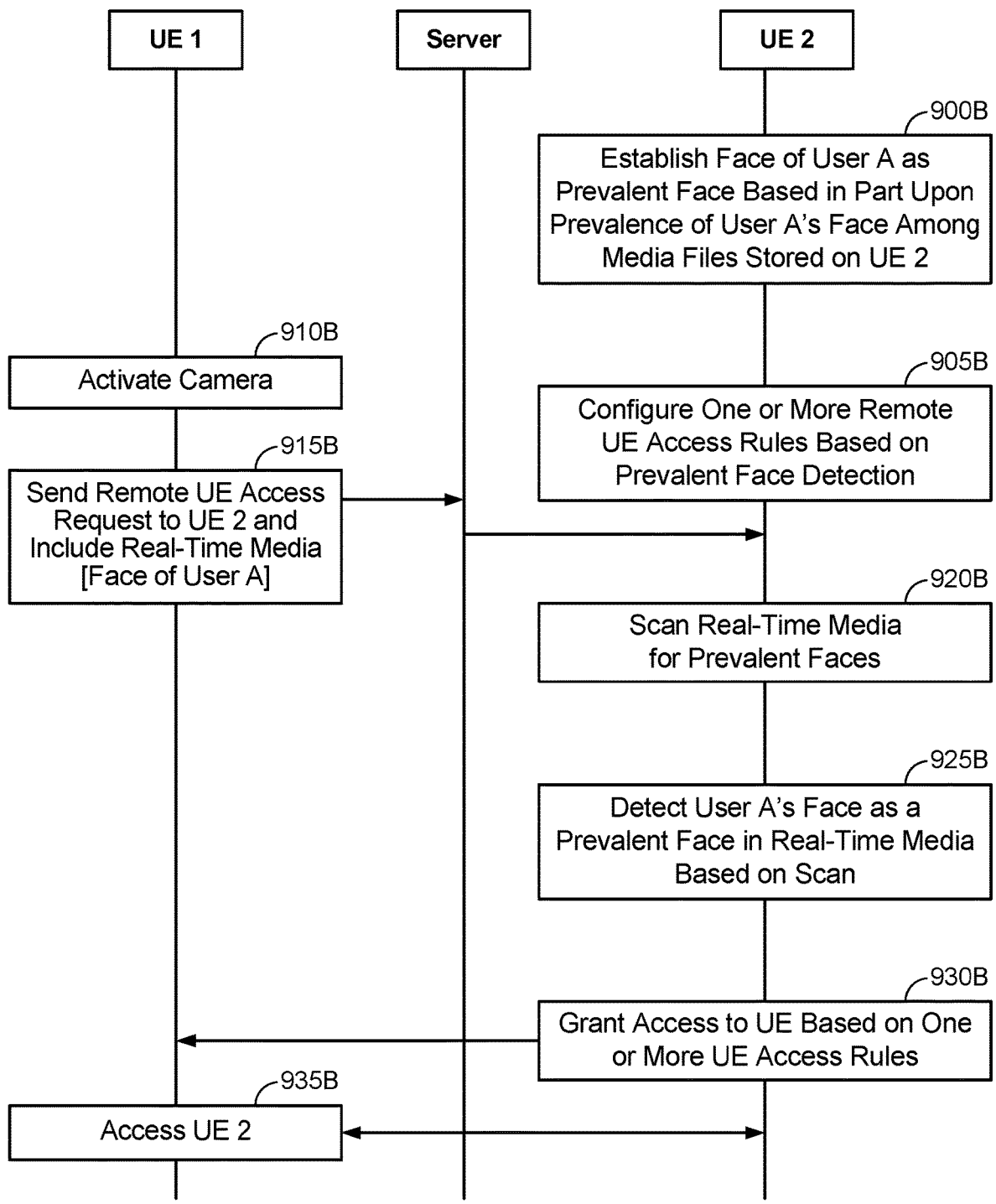
FIG. 9B illustrates an example implementation of the process of FIG. 4 in accordance with another embodiment of the disclosure.

FIG. 9B illustrates an example implementation of the process of FIG. 4 in accordance with another embodiment of the disclosure. While FIG. 9A describes an example whereby the action performed at block 415 of FIG. 4 is selective authorization of local access to the UE, FIG. 9B relates to an alternative scenario whereby the action performed at block 415 of FIG. 4 is selective authorization of remote access to the UE.

Referring to FIG. 9B, at block 900B, assume that the face of User A is established as a prevalent face based in part upon a prevalence of User A's face among media files stored on UE 2. In an example, block 900B may occur as a result of execution of blocks 400-405 of FIG. 4. At block 905B, UE 2 configures (e.g., based on user input, based on default system or application-specific settings, etc.) one or more remote UE access rules based on prevalent face detection (e.g., detection of User A's face or some other prevalent face).

Referring to FIG. 9B, assume that UE 1 is operated by User A, and that User A wants to obtain remote access to UE 2 via UE 1. At block 910B, UE 2 activates a camera (e.g., an integrated front or rear-facing camera on UE 1, a camera coupled to UE 1 via a USB or other cabled connection, a camera wirelessly connected to UE 1, etc.) and captures real-time media that includes a face of User A. At block 915B, UE 1 then sends a remote UE access request to UE 2 including the real-time media (e.g., via a server, although in an alternative embodiment the remote UE access request could be sent via D2D). UE 2 receives the remote UE access request with the real-time media and, at block 920B, initiates scanning of the real-time media to detect any prevalent faces (e.g., as in block 410 of FIG. 4). More specifically, the scanning of block 920B applies facial recognition one or more individual video frames within the real-time media for comparison against a set of faces that have been designated as being prevalent, such as the designation of User A's face at block 900B. At block 925B, UE 2 detects the face of User A in the one or more video frames of the real-time media based on the scan of block 920B. In an example, the detection of User A's face at block 925B triggers recognition of User A's face as a prevalent face based on block 900B.

Based on the detection of User A's face as a prevalent face at block 925B, UE 2 grants UE 1 remote access to UE 2 in accordance with the one or more local UE access rules configured at block 930B, and UE 1 remotely accesses UE 2 based on the grant at block 935B. The one or more remote UE access rules may correspond to any of the local UE access rule examples described above, except that the access occurs over a server-based or D2D connection between UEs 1 and 2.

In other embodiments, other types of actions can be implemented in conjunction with block 415 of FIG. 4 based upon prevalent face detection. These actions can be implemented either in addition to, or in place of, the actions described above with respect to block 415 of FIG. 4 (e.g., adding enhancement effects to real-time media, authorizing a communicative operation to proceed and/or authorizing access to the UE). The other action types that may be implemented in conjunction with block 415 of FIG. 4 based upon prevalent face detection may include any of example actions described in the following paragraphs.

Figure 10A:
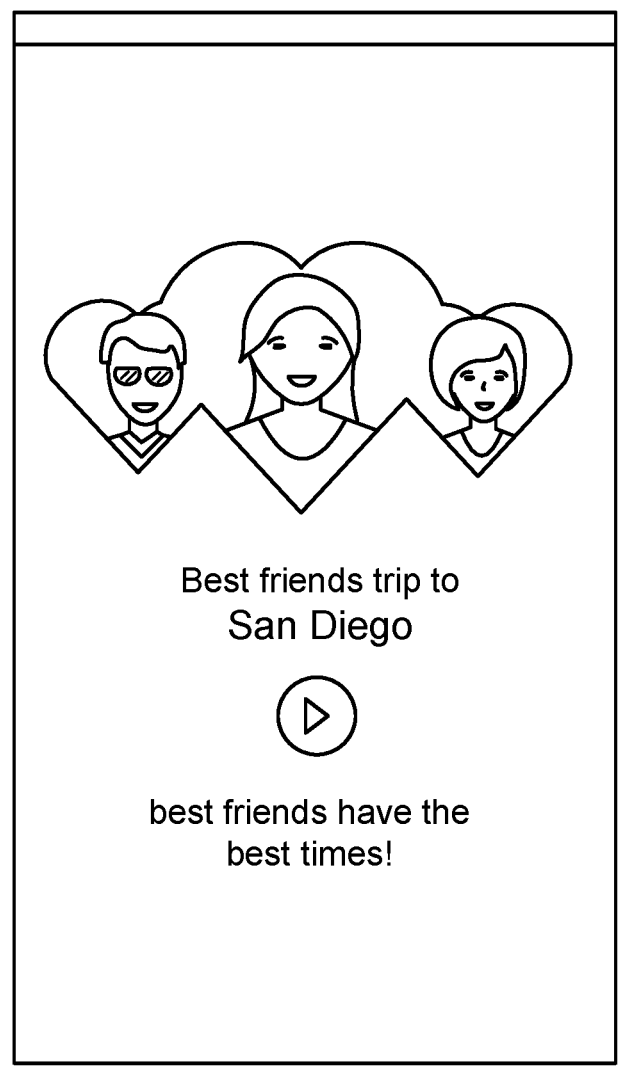
FIG. 10A illustrates a screenshot depicting an advertisement of a video summary for a San Diego trip in accordance with an embodiment of the disclosure.
Figure 10B:
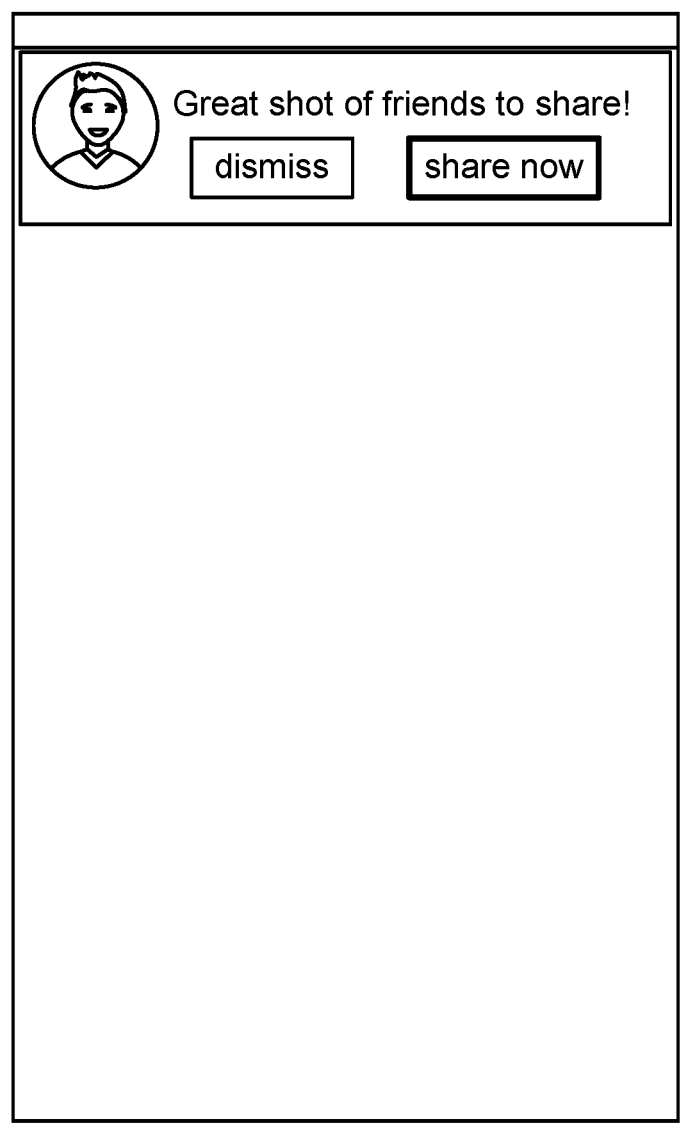
FIG. 10B illustrates a screenshot depicting a social network prompt for sharing a media file containing a prevalent face in accordance with an embodiment of the disclosure.
Figure 10C:
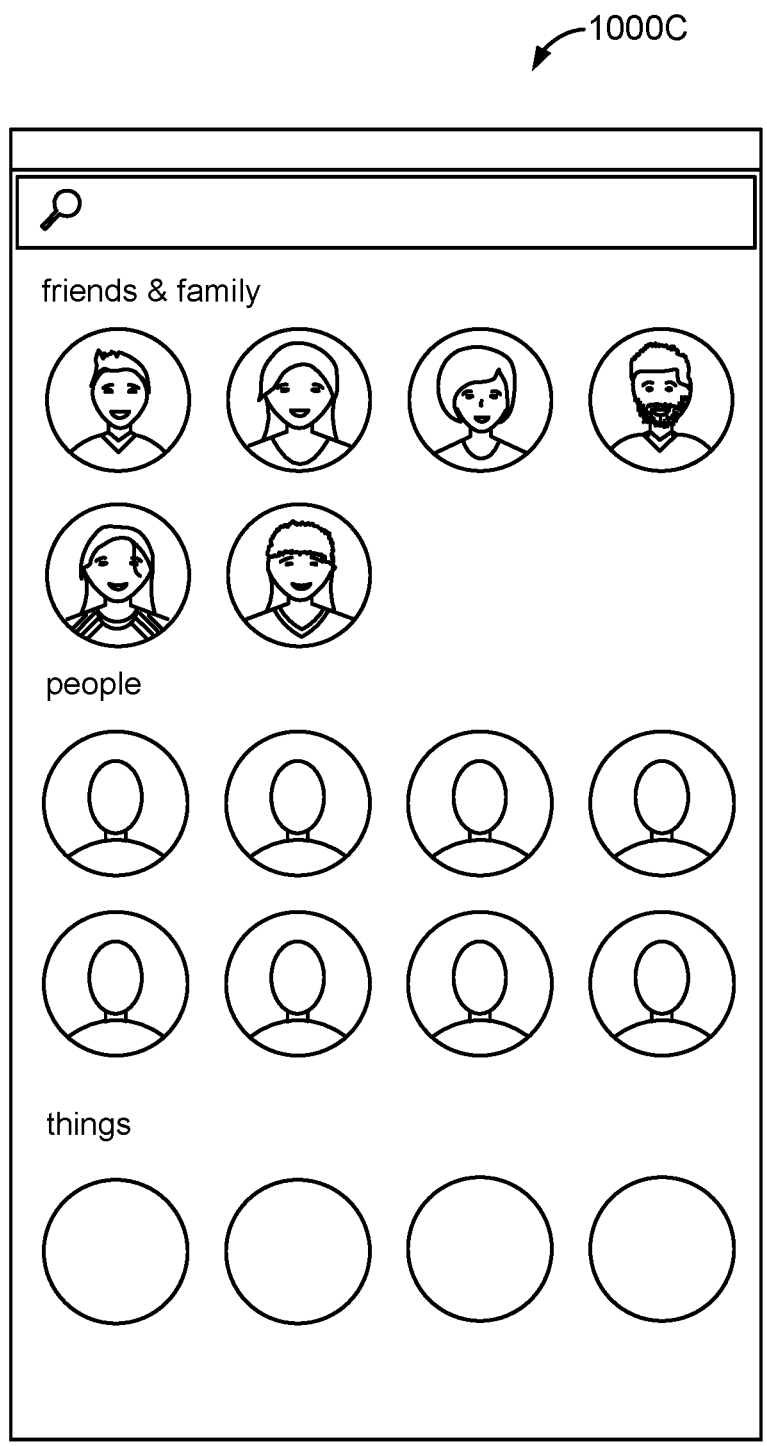
FIG. 10C illustrates a screenshot depicting a friends and family category that includes face-specific media groups for prevalent faces in accordance with an embodiment of the disclosure.
Figure 10D:
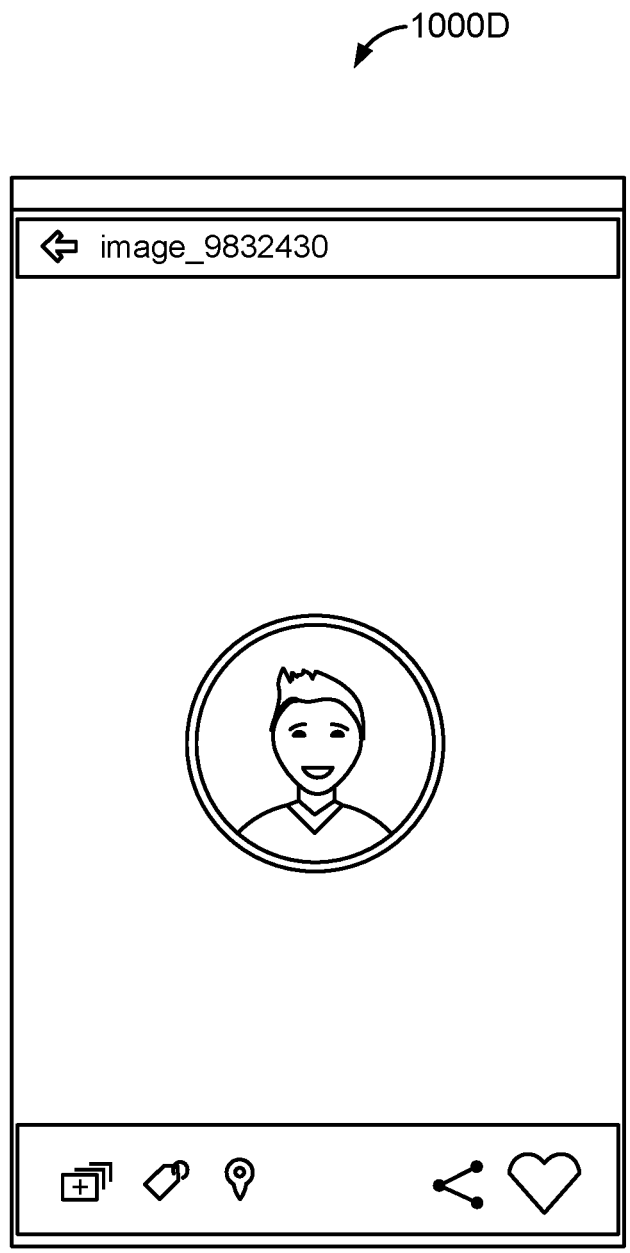
FIG. 10D illustrates a screenshot depicting a media file containing a prevalent face being automatically labeled as a "Favorite" media file that is added to a "Favorites" folder maintained by a media gallery application in accordance with an embodiment of the disclosure.
Figure 10E:
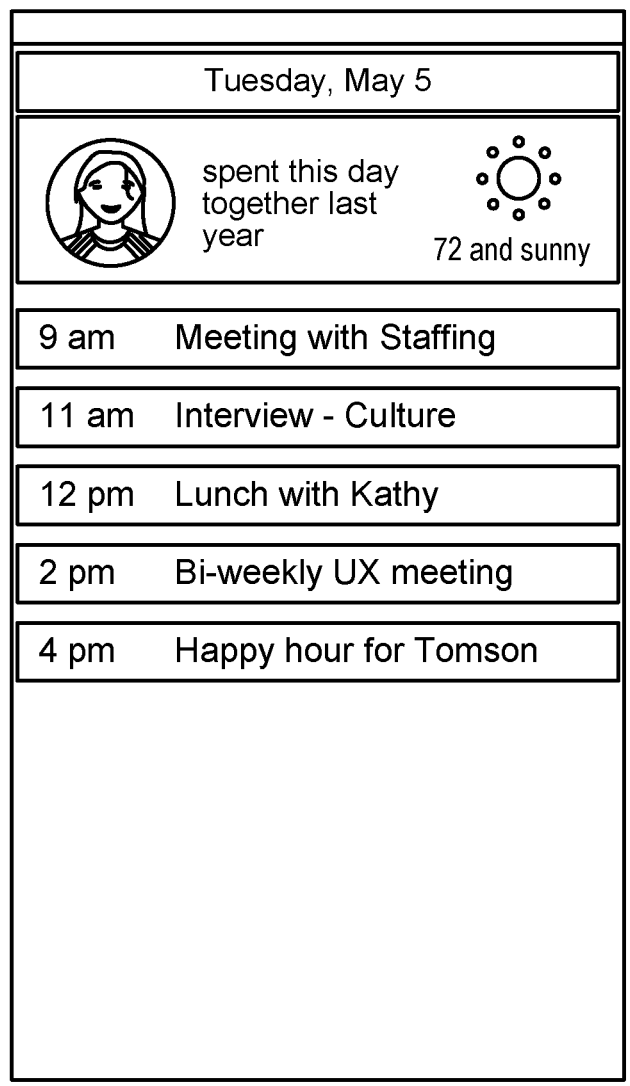
FIG. 10E illustrates a screenshot depicting a one-year reminder of a photo containing a prevalent face that is added as a calendar reminder in accordance with an embodiment of the disclosure.
Figure 10F:
FIG. 10F illustrates a screenshot depicting a messenger application on a UE that prompts a user to share media files containing a prevalent face of a friend during a conversation with that friend in accordance with an embodiment of the disclosure.
Figure 10G:
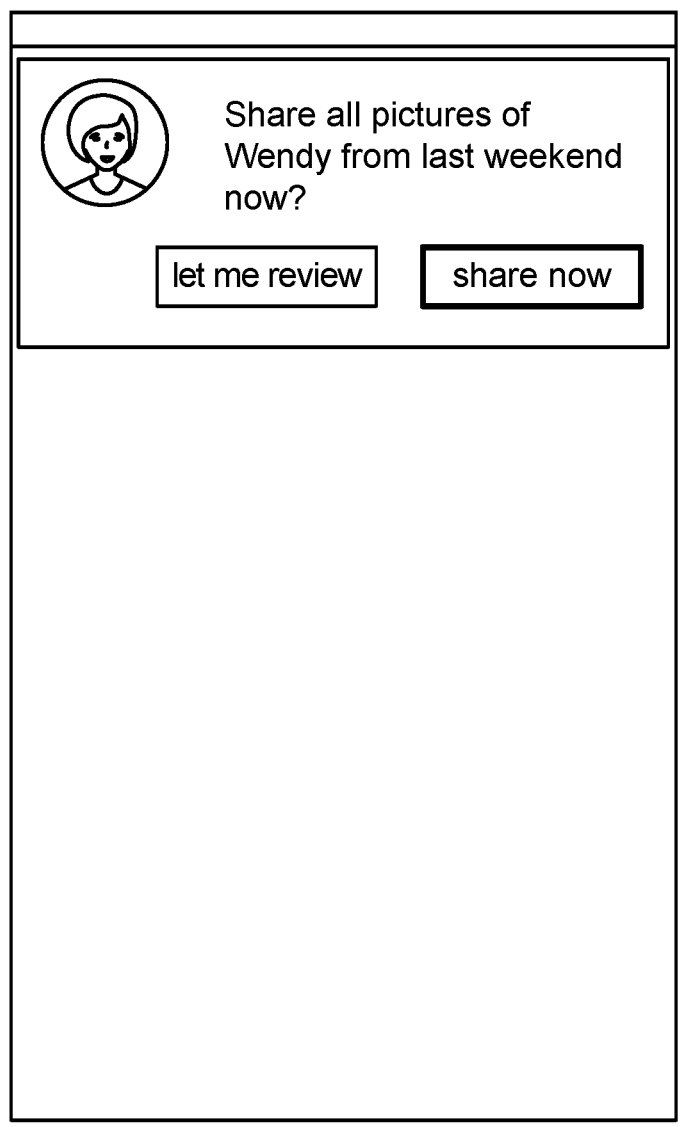
FIG. 10G illustrates a screenshot depicting an in-bulk picture transfer prompt in accordance with an embodiment of the disclosure.
Figure 10H:
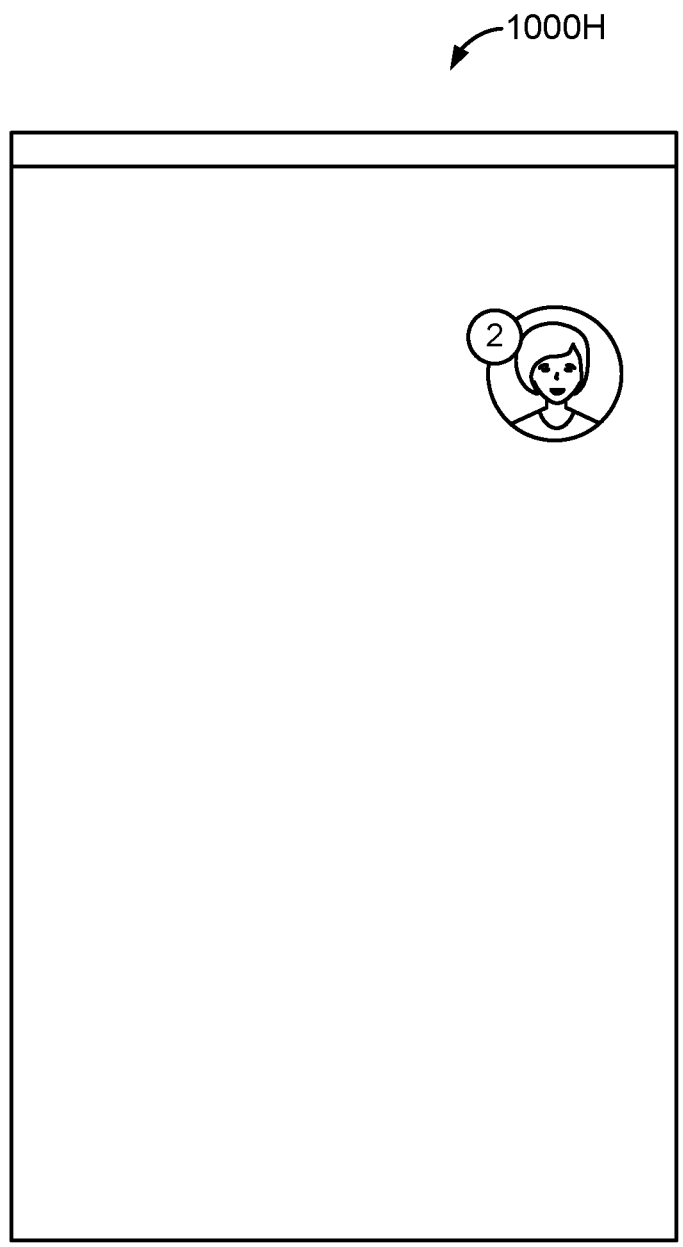
FIG. 10H illustrates a screenshot depicting a representation of mutual friend commonality based on association with a prevalent face in accordance with an embodiment of the disclosure.
Figure 10I:
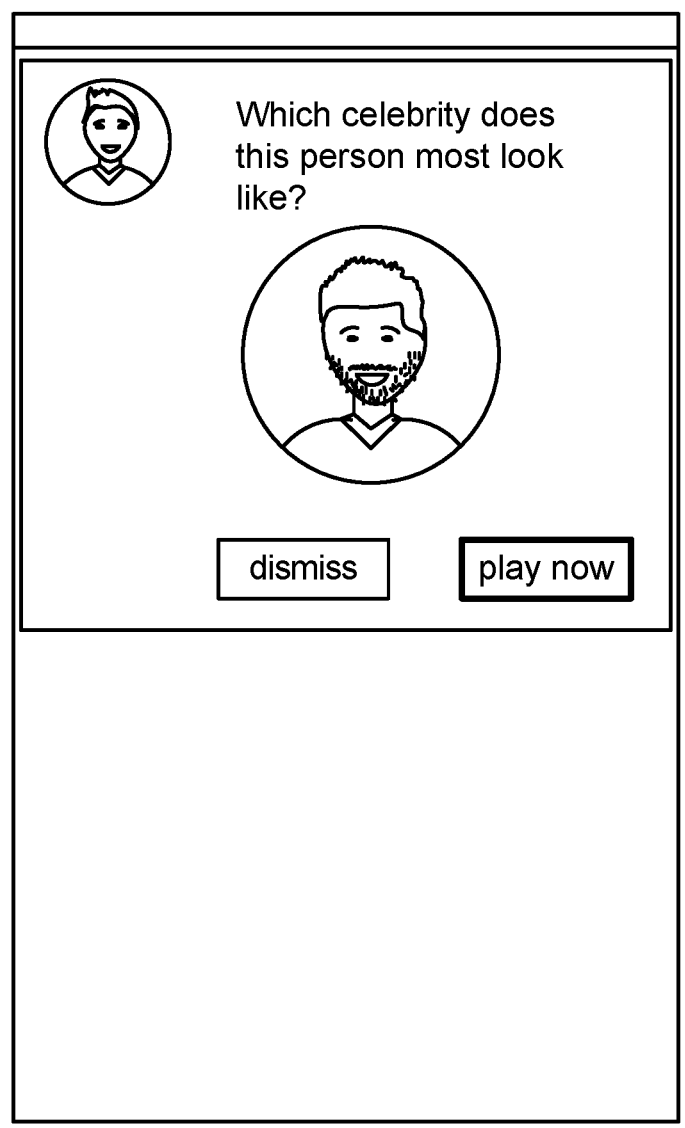
FIG. 10I illustrates a screenshot depicting a game where a user of a UE is asked to designate which celebrities look most like particular prevalent faces in accordance with an embodiment of the disclosure.
Figure 10J:
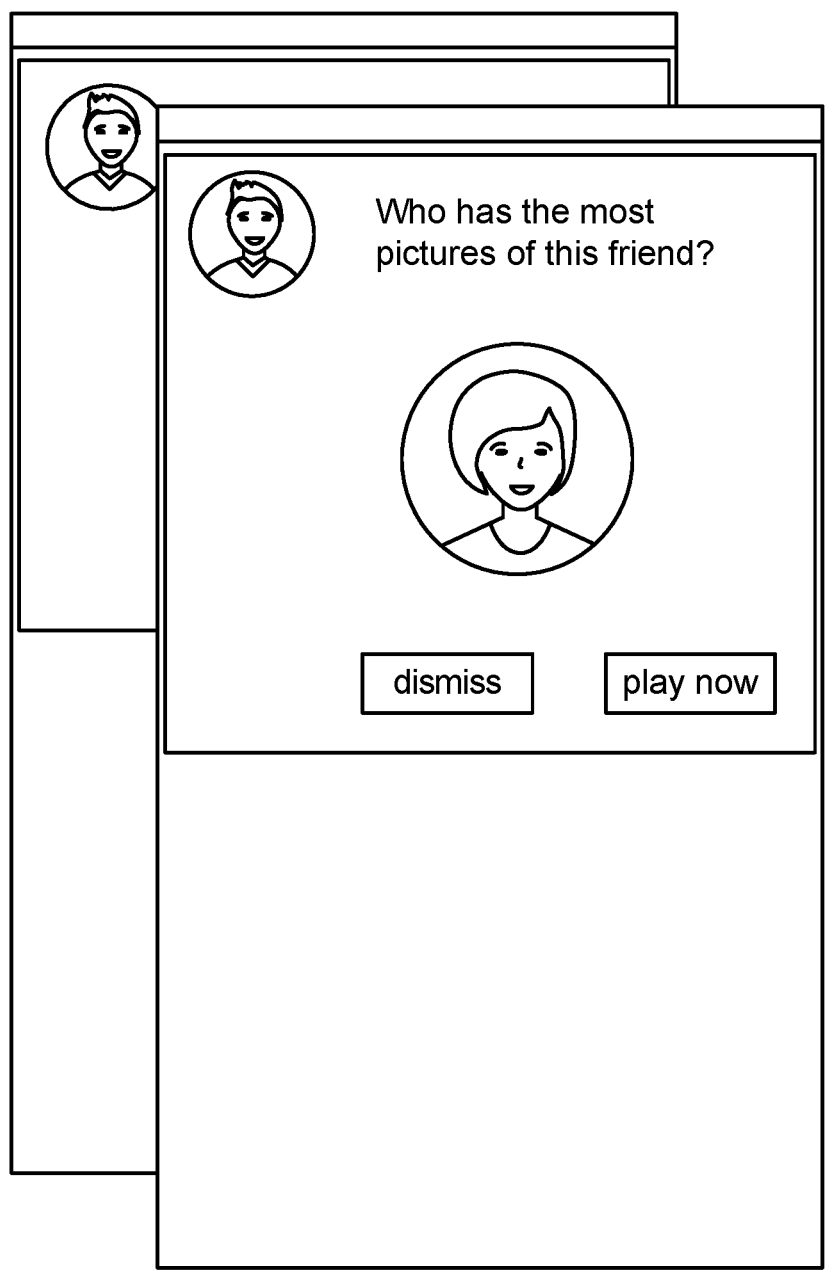
FIG. 10J illustrates a screenshot depicting a game where a user of a UE is asked to guess who has the most pictures of a particular prevalent face in accordance with an embodiment of the disclosure.
Figure 10K:
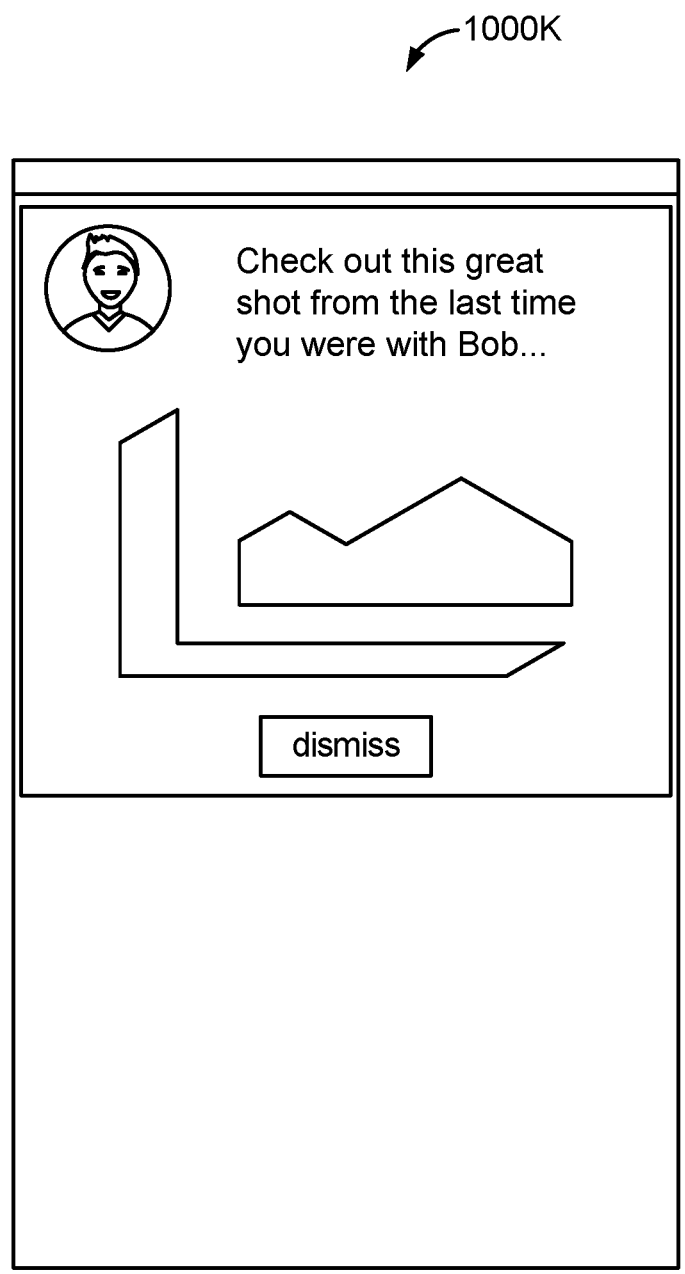
FIG. 10K illustrates a screenshot depicting a user being prompted to view older pictures and/or videos containing the same prevalent face from previous interactions in accordance with an embodiment of the disclosure.

Video Summary:

Media files (e.g., photos and/or videos) from one or more face-specific media groups can be merged together to form a video slideshow. In a further example, the media files can be filtered by location and/or time. For example, User A travels to San Diego for 1 week and captures a high number of media files containing the faces of Friend B and Friend C, which are established as prevalent faces on a UE operated by User A. A video slideshow that includes media files containing the prevalent faces of Friend B and Friend C can be generated by the UE based on the prevalent face detections of Friend B and Friend C with the additional filters of location (San Diego) and time (the 1 week trip period), such that media files that were not captured in San Diego during that particular week with the faces of Friend B and Friend C contained therein are excluded from the video slideshow. Screenshot 1000A of FIG. 10A depicts an example of an advertisement of a video summary for the above-noted San Diego trip in accordance with an embodiment of the disclosure;

Social Networking Prompts:

A UE can prompt a user to share media files containing one or more prevalent faces with a social network, as opposed to presenting a full listing of media files to the user for selection. For example, a user is more likely to want to share media files depicting his/her close friends and family (e.g., a new baby, etc.) than pictures that do not depict such people. Screenshot 1000B of FIG. 10B depicts an example of a social network prompt for sharing a media file containing a prevalent face in accordance with an embodiment of the disclosure;

Media Gallery Enhancements:

In an example, a UE can create a friends and family category that includes face-specific media groups for prevalent faces, as depicted in screenshot 1000C of FIG. 10C. In another example, any media file containing a prevalent face can be automatically labeled as a "Favorite" media file that is added to a "Favorites" folder maintained by the media gallery application, as depicted in screenshot 1000D of FIG. 10D;

Calendar Enhancements:

In an example, calendar notifications can be generated based on media files containing prevalent faces. For example, a one-year reminder of a photo containing a prevalent face may be added as a calendar reminder as depicted in screenshot 1000E of FIG. 10E;

Texting Enhancements:

In an example, a messenger application on the UE may prompt a user to share media files containing a prevalent face of a friend during a conversation with that friend, as depicted in screenshot 1000F of FIG. 10F. In an example, the friend may be identified as corresponding to the prevalent face based on a profile picture;

Media File Sharing Enhancements:

Media files contained in face-specific media groups can be shared in-bulk without having to be manually grouped by a user for transmission. An example of an in-bulk picture transfer prompt is depicted in screenshot 1000G of FIG. 10G;

Mutual Friend Visualization Enhancements:

A representation of mutual friend commonality can be associated with a prevalent face, as shown in screenshot 1000H of FIG. 10H;

Gallery Games:

In an example, a user of a UE may be prompted with questions related to one or more prevalent faces. In a single player example, the user of the UE may be asked to play a game to designate which celebrities look most like particular prevalent faces, as depicted via screenshot 1000I of FIG. 10I. In a multi-player example, different UEs having the same prevalent face may be prompted with social gaming questions, such as to guess which UE has the most pictures of a shared prevalent face, as depicted in screenshot(s) 1000J of FIG. 10J;

Icebreakers:

In an example, a UE may detect that the UE is in proximity to a particular person with a prevalent face. For example, the UE may capture a new photo or video, and then determine that the prevalent face is contained therein, which indicates that the UE is near the person with the prevalent face right now. This detection may trigger some type of user prompt, such as prompting the user of the UE to view older pictures and/or videos containing the same prevalent face from previous interactions, as depicted via screenshot 1000K of FIG. 10K;

Profiling of Prevalent Faces:

Common characteristics associated with media files containing particular prevalent faces may be analyzed to profile the prevalent faces. For example, a person with a pet dog is likely to take a high number of photos that include both the face of the person as well as the pet dog. If this person is a prevalent face, the prevalent face can be characterized as belonging to a dog-owner or dog-lover in one example. In another example, a prevalent face may be captured in media files that are geotagged at particular locations with a high frequency (e.g., their home, favorite restaurants, their office, etc.), and the prevalent face may become associated with those particular locations (e.g., so if the UE is ever at any of those particular locations, the UE may provide a notification related to the prevalent face, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   recognizing a set of faces within a set of media files stored on the UE;
   identifying a set of prevalent faces based on a set of criteria including a prevalence of one or more faces among the set of media files, and wherein the set of criteria is based in part upon one or more file metadata criteria including a degree of similarity between the set of media files containing at least one face among the set of faces, a degree the set of media files containing the at least one face are shared with one or more external entities, a rate the set of media files containing the at least one face are deleted, or any combination thereof;
   determining whether any prevalent faces from the set of prevalent faces are present in real-time media;
   performing an action based on whether any prevalent faces are detected from the set of prevalent faces in the real-time media, the action including one or more of:
   adding one or more enhancement effects to the real-time media,
   authorizing a communicative operation to proceed, or
   authorizing access to the UE.

2. The method of claim 1, wherein the recognizing and the identifying are implemented without associating the set of faces with a corresponding set of user identities.

3. The method of claim 1, wherein the set of criteria includes:
   one or more ranking rules by which faces among the set of faces are ranked based at least in part by prevalence, or
   a prevalence threshold to be met for a face among the set of faces to qualify for the set of prevalent faces, or
   one or more secondary criteria by which a prevalence attribute of at least one face among the set of faces is weighted, or
   any combination thereof.

4. The method of claim 3, wherein the one or more secondary criteria include one or more facial criteria.

5. The method of claim 4, wherein the one or more facial criteria include:
   an age of the at least one face,
   a mood indicated by the at least one face,
   a facial expression on the at least one face,
   a gender indicated by the at least one face,
   a degree of facial symmetry of the at least one face,
   a shape of the at least one face,
   whether adornments and/or accessories are worn or attached to the at least one face,
   a size of the at least one face within a respective media file,
   whether a focus of a respective media file is placed onto the at least one face, or
   any combination thereof.

6. The method of claim 3, wherein the one or more secondary criteria include the one or more file metadata criteria.

7. The method of claim 6, wherein the one or more file metadata criteria further includes:
   an amount of time elapsed since media files containing the at least one face were captured, added to the UE and/or accessed on the UE;
   a frequency at which the media files containing the at least one face occur,
   a location at which the media files containing the at least one face are captured, or
   any combination thereof.

8. The method of claim 1,
   wherein at least one prevalent face is detected in the real-time media, and
   wherein the action includes adding the one or more enhancement effects to the real-time media.

9. The method of claim 8, wherein the one or more enhancement effects further include:
   auto-tracking, auto-focusing and/or zooming in upon the at least one detected prevalent face within the real-time media.

10. The method of claim 8,
    wherein the at least one prevalent face is detected in the real-time media, and
    wherein the action includes authorizing the communicative operation to proceed.

11. The method of claim 10, wherein the communicative operation includes texting, uploading or downloading a file, logging onto a social networking site or any combination thereof.

12. The method of claim 1,
    wherein at least one prevalent face is detected in the real-time media, and
    wherein the action includes authorizing the access to the UE.

13. The method of claim 12, wherein the action authorizes local access to the UE.

14. The method of claim 13, wherein the real-time media includes a video feed captured at the UE.

15. The method of claim 12, wherein the action authorizes remote access to the UE.

16. The method of claim 15, wherein the real-time media includes a video feed captured at an external UE.

17. The method of claim 12, wherein the authorizing of the access to the UE includes:
    granting limited access to media files among the set of media files that contain the at least one detected prevalent face,
    unlocking the UE,
    granting limited access to a particular application or application mode,
    granting limited access to change one or more operating parameters of the UE via a configuration utility, or
    any combination thereof.

18. A method of operating a user equipment (UE):
    recognizing a set of faces within a set of media files stored on the UE;
    identifying a set of prevalent faces based on a set of criteria including a prevalence of one or more faces among the set of media files;
    determining whether any prevalent faces from the set of prevalent faces are present in real-time media;

performing an action based on whether any prevalent faces are detected from the set of prevalent faces in the real-time media, the action including one or more of:
adding one or more enhancement effects to the real-time media,
authorizing a video call to proceed, or
authorizing access to the UE, and
wherein the real-time media includes a video feed captured at an external UE that is attempting to originate the video call with the UE.

19. The method of claim 18, wherein the action includes one or more of auto-accepting the video call, announcing the video call to a user to facilitate a manual call acceptance decision, blocking the video call without notifying the user, announcing the video call to the user with an urgent ringtone, announcing the video call to the user without the urgent ringtone, or any combination thereof.

20. A user equipment (UE), comprising: at least one processor configured to:
recognize a set of faces within a set of media files stored on the UE;
identify a set of prevalent faces based on a set of criteria including a prevalence of one or more faces among the set of media files, and wherein the set of criteria is based in part upon one or more file metadata criteria including a degree of similarity between the set of media files containing at least one face among the set of faces, a degree the set of media files containing the at least one face are shared with one or more external entities, a rate the set of media files containing the at least one face are deleted, or any combination thereof;
determine whether any prevalent faces from the set of prevalent faces are present in the real-time media;
perform an action based on whether any prevalent faces from the set of prevalent faces are detected in the real-time media, the action including one or more of:
adding one or more enhancement effects to the real-time media,
authorizing a communicative operation to proceed, or
authorizing access to the UE.

21. The UE of claim 20, wherein the at least one processor recognizes the set of faces and identifies the set of prevalent faces without associating either set of faces with a corresponding set of user identities.

22. The UE of claim 21, wherein the set of criteria includes:
one or more ranking rules by which faces among the set of faces are ranked based at least in part by prevalence, or
a prevalence threshold to be met for a face among the set of faces to qualify for the set of prevalent faces, or
one or more secondary criteria by which a prevalence attribute of at least one face among the set of faces is weighted, or
any combination thereof.

23. The UE of claim 22, wherein the one or more secondary criteria include one or more facial criteria, the one or more file metadata criteria, or any combination thereof.

24. A non-transitory computer-readable medium containing instructions stored thereon, which, when executed by a user equipment (UE), cause the UE to perform actions, the instructions comprising:
at least one instruction to cause the UE to recognize a set of faces within a set of media files stored on the UE;
at least one instruction to cause the UE to identify a set of prevalent faces based on a set of criteria including a prevalence of one or more faces among the set of media files, and wherein the set of criteria is based in part upon one or more file metadata criteria including a degree of similarity between the set of media files containing at least one face among the set of faces, a degree the set of media files containing the at least one face are shared with one or more external entities, a rate the set of media files containing the at least one face are deleted, or any combination thereof;
at least one instruction to cause the UE to determine whether any prevalent faces from the set of prevalent faces are present in real-time media;
at least one instruction to cause the UE to perform an action based on whether any prevalent faces from the set of prevalent faces are detected in the real-time media, the action including one or more of:
adding one or more enhancement effects to the real-time media,
authorizing a communicative operation to proceed, or
authorizing access to the UE.

25. The non-transitory computer-readable medium of claim 24, wherein the at least one instruction to cause the UE to recognize and the at least one instruction to cause the UE to identify cause the UE to recognize the set of faces and identify the set of prevalent faces without associating either set of faces with a corresponding set of user identities.

26. The non-transitory computer-readable medium of claim 24, wherein the set of criteria includes:
one or more ranking rules by which faces among the set of faces are ranked based at least in part by prevalence, or
a prevalence threshold to be met for a face among the set of faces to qualify for the set of prevalent faces, or
one or more secondary criteria by which a prevalence attribute of at least one face among the set of faces is weighted, or
any combination thereof.

* * * * *